United States Patent [19]
Dent

[11] Patent Number: 5,091,942
[45] Date of Patent: Feb. 25, 1992

[54] AUTHENTICATION SYSTEM FOR DIGITAL CELLULAR COMMUNICATIONS

[75] Inventor: Paul Dent, Stehag, Sweden

[73] Assignee: Ericsson GE Mobile Communications Holding, Inc., Paramus, N.J.

[21] Appl. No.: 556,890

[22] Filed: Jul. 23, 1990

[51] Int. Cl.$^5$ ............................................. H04L 9/02
[52] U.S. Cl. ......................................... 380/46; 380/44; 379/59; 455/33
[58] Field of Search ....................... 380/21, 23, 28, 43, 380/44, 46, 47, 48, 49, 50; 455/33; 375/110, 112, 107; 370/103, 105, 107; 379/59, 60

[56] References Cited

U.S. PATENT DOCUMENTS

| | | | |
|---|---|---|---|
| 3,934,078 | 1/1976 | Gannett | 178/22 |
| 4,549,308 | 10/1985 | LoPinto | 455/26 |
| 4,555,805 | 11/1985 | Talbot | 455/26 |
| 4,649,543 | 3/1987 | Levine | 371/41 |
| 4,731,840 | 3/1988 | Mniszewski et al. | 380/21 |
| 4,754,481 | 6/1988 | Feggeler | 380/41 |
| 4,803,726 | 2/1989 | Levine et al. | 380/48 |
| 4,827,507 | 5/1989 | Marry et al. | 380/38 |
| 4,860,353 | 8/1889 | Brown | 380/44 |
| 4,876,740 | 10/1989 | Levine et al. | 455/33 |
| 4,896,370 | 1/1990 | Kasparian et al. | 455/77 |
| 4,914,696 | 4/1990 | Dudczak et al. | 380/21 |
| 4,924,480 | 5/1990 | Gay et al. | 375/8 |
| 4,926,665 | 5/1990 | Stapley et al. | |

*Primary Examiner*—Thomas H. Tarcza
*Assistant Examiner*—Tod R. Swann
*Attorney, Agent, or Firm*—Johnson & Gibbs

[57] ABSTRACT

A system for the authentication of mobile stations and base stations in a cellular communications network. The system includes an algorithm which generates not only a key dependent response to a random challenge, but also a temporary conversation key or call variable which may be used to encipher traffic in the network. To protect against clones in the network, the algorithm uses a rolling key which contains historical information. A bilateral authentication procedure may be used to update the rolling key and to generate a new conversation key.

32 Claims, 7 Drawing Sheets

AUTHENTICATION SYSTEM FOR DIGITAL CELLULAR COMMUNICATIONS

CROSS REFERENCE TO RELATED APPLICATIONS

This application contains subject matter related to co-pending U.S. patent application Ser. No. 556,358, entitled "Encryption System For Digital Cellular Communications"; to co-pending U.S. patent application Ser. No. 556,102, entitled "Continuous Cipher Synchronization for Cellular Communication System"; and to co-pending U.S. patent application Ser. No. 556,103, entitled "Resynchronization of Encryption Systems Upon Handoff"; each of which were filed on July 20, 1990 and assigned to the assignee of the present invention. Such applications and the disclosures therein are hereby incorporated by reference herein

BACKGROUND OF THE INVENTION

1. Field of the Invention

The present invention relates to digital cellular communication systems, and more particularly to a method and apparatus for enhancing the security of data communications within such a system.

2. History of the Prior Art

Cellular radio communications is, perhaps, the fastest growing field in the world-wide telecommunications industry. Although cellular radio communication systems comprise only a small fraction of the telecommunications systems presently in operation, it is widely believed that this fraction will steadily increase and will represent a major portion of the entire telecommunications market in the not too distant future. This belief is grounded in the inherent limitations of conventional telephone communications networks which rely primarily on wire technology to connect subscribers within the network. A standard household or office telephone, for example, is connected to a wall outlet, or phone jack, by a telephone cord of a certain maximum length. Similarly, wires connect the telephone outlet with a local switching office of the telephone company. A telephone user's movement is thus restricted not only by the length of the telephone cord, but also by the availability of an operative telephone outlet, i.e. an outlet which has been connected with the local switching office. Indeed, the genesis of cellular radio systems can be attributed, in large part, to the desire to overcome these restrictions and to afford the telephone user the freedom to move about or to travel away from his home or office without sacrificing his ability to communicate effectively with others. In a typical cellular radio system, the user, or the user's vehicle, carries a relatively small, wireless device which communicates with a base station and connects the user to other mobile stations in the system and to landline parties in the public switched telephone network (PSTN).

A significant disadvantage of existing cellular radio communication systems is the ease with which analog radio transmissions may be intercepted. In particular, some or all of the communications between the mobile station and the base station may be monitored, without authorization, simply by tuning an appropriate electronic receiver to the frequency or frequencies of the communications. Hence, anyone with access to such a receiver and an interest in eavesdropping can violate the privacy of the communications virtually at will and with total inpunity. While there have been efforts to make electronic eavesdropping illegal, the clandestine nature of such activities generally means that most, if not all, instances of eavesdropping will go undetected and, therefore, unpunished and undeterred. The possibility that a competitor or a foe may decide to "tune in" to one's seemingly private telephone conversations has heretofore hindered the proliferation of cellular radio communication systems and, left unchecked, will continue to threaten the viability of such systems for businesses and government applications.

It has recently become clear that the cellular radio telecommunications systems of the future will be implemented using digital rather than analog technology. The switch to digital is dictated, primarily, by considerations relating to system speed and capacity. A single analog, or voice, radio frequency (RF) channel can accommodate four (4) to six (6) digital, or data, RF channels. Thus, by digitizing speech prior to transmission over the voice channel, the channel capacity and, consequently the overall system capacity, may be increased dramatically without increasing the bandwidth of the voice channel. As a corollary, the system is able to handle a substantially greater number of mobile stations at a significantly lower cost.

Although the switch from analog to digital cellular radio systems ameliorates somewhat the likelihood of breeches in the security of communications between the base station and the mobile station, the risk of electronic eavesdropping is far from eliminated. A digital receiver may be constructed which is capable of decoding the digital signals and the original speech. The hardware may be more complicated and the undertaking more expensive than in the case of analog transmission, but the possibility persists that highly personal or sensitive conversations in a digital cellular radio system may be monitored by a third party and potentially used to the detriment of the system users. Moreover, the very possibility of third parties eavesdropping of a telephone conversation eliminates cellular telecommunications as a medium for certain government communications. Certain business users may be equally sensitive to even the possibility of a security breech. Thus, to render cellular systems as viable alternatives to the conventional wireline networks, security of communications must be available on at least some circuits.

Various solutions have been proposed to alleviate the security concerns engendered by radio transmission of confidential data. A known solution, implemented by some existing communication systems, uses cryptoalgorithms to encrypt (scramble) digital data into an unintelligible form prior to transmission. For example, the article entitled "Cloak and Data" by Rick Grehan in *BYTE Magazine*, dated June 1990 at pages 311-324, for a general discussion of cryptographic systems. In most systems currently available, speech is digitized and processed through an encryption device to produce a communications signal that appears to be random or pseudo-random in nature until it is decrypted at an authorized receiver. The particular algorithm used by the encryption device may be a proprietary algorithm or an algorithm found in the public domain. Further background for such techniques may be found in the article entitled "The Mathematics of Public-Key Cryptography" by Martin E. Hellman in *Scientific American* dated August 1979 at 146-167.

One technique for the encryption of data relies on "time-of-day" or "frame number" driven keystream generators to produce keystreams of pseudo-random bits which are combined with the data to be encrypted. Such keystream generators may synchronized to a time of day counter, i.e. hour, minute and second, or to a simple number counter and the encryption and decryption devices may be synchronized by transmitting the current count of the transmitter counter to the receiver in the event one falls out of synchronization with another.

To increase the security of communications in systems utilizing time-of-day or frame number driven keystream generators, the value of each bit in the pseudo-random keystream is preferably made a function of the values of all the key bits in an encryption key. In this manner, a person desiring to descramble the encrypted signal must "crack" or "break" all of the bits of the encryption key which may be in the order of fifty (50) to one hundred (100) bits or more. A keystream of this type is generally produced by mathematically expanding the encryption key word in accordance with a selected algorithm which incorporates the count of the time-of-day counter. However, if every bit of the encryption key is to influence every bit in the keystream and if the keystream is to be added to the data stream bits on a one-to-one basis, the required number of key word expansion computations per second is enormous and can readily exceed the real time computational capability of the system. The co-pending application entitled "Encryption System for Digital Cellular Communications", referred to above, achieves such expansion Of the keystream with conventional microprocessors and at conventional microprocessor speeds.

The use of an encryption key to generate a pseudo-random keystream which is a complex function of all the key bits is a very useful tool for securing digital communications. Other tools may include arrangements for ensuring that the secret key assigned to each mobile station (the permanent key) is never directly used outside of the home network, i.e., the normal service and billing area of the mobile station. Instead, the permanent key is used to generate other bits (the security key) which are used for enciphering a particular call and which may be transmitted from the home network to a visited network, i.e., an area other than the normal billing area into which the mobile station has roamed. Such arrangements reduce the risk of unauthorized disclosure of the permanent secret key to a third party which may use that key to defeat the encryption process.

Yet another tool for securing communications in a digital cellular system is the authentication of mobile stations at registration, call initiation or call reception. Authentication may be simply viewed as the process of confirming the identity of the mobile station. Both authentication and encryption require communication between the visited network and the home network, where the mobile station has a permanent registration, in order to obtain mobile-specific information such as the security key used for encryption. According to the present invention, the functions of authentication and encryption are linked so that a single inter-network transaction establishes both functions. As described in detail hereafter, the present invention achieves such integration by generating, in the same transaction, not only a key-dependent response (RESP) to a random challenge (RAND), but also the security key (S-key) used to encipher user traffic.

In the American Digital Cellular (ADC) system currently under development, only the air interface is directly specified. Nevertheless, the specification of desirable security functions within the ADC system, e.g., authentication and encryption, can indirectly determine the network security architecture. With respect to authentication, the architecture options relate to whether the authentication algorithm should be executed in the home network or, alternatively, in the visited network. A choice between the two options is necessary for the defintion of a suitable algorithm because the possible input parameters to the algorithm which are available in the home network may not necessarily be the same as those which are available in the visited network. As explained hereafter, the present invention takes account of the significant security benefits which attach to the execution of the authentication algorithm in the home network.

A serious problem in existing cellular systems may be referred to as the "false mobile station" syndrome. Heretofore, it has been possible to copy the entire memory contents of a mobile station and to use that information to manufacture clones which can demand and receive service from the network. One proposed solution is to provide each authorized mobile station with a specific authentication module, or smart card, which has write-only access for the permanent key. This solution, however, renders the mobile station more complex and more expensive. The present invention includes a "rolling key" which provides a more cost effective safeguard against the threat of false mobile stations. In addition, to meet the threat of "false base station" in the network, the present invention includes a bilateral authentication procedure which may be used when the rolling key is updated. This two-way authentication procedure enhances security and permits bilateral authentication to be performed on the dedicated traffic channels of the system at any time during a call. Each authentication step may be performed at the option of the network operator, but must be performed at least once after the active presence of a mobile station is first detected within a network so as to generate an S-key for the first call.

A mobile station may occassionaly roam into a small, isolated visited network which lacks the communications links with the home network needed to support authentication and encryption in accordance with the general system of the present invention. Such a visited network may choose to accept a call or registration from the mobile station without performing authentication and to indicate by means of a bit in the traffic channel definition that the mobile identification number (MIN) of the mobile station may be used as a default S-key.

The system of the present invention will be set forth below in connection with an overall digital cellular system and a system for generating a pseudo-random keystream for use in enciphering traffic data in the cellular system. Where appropriate or useful for purposes of background and/or comparison, reference will be made to the *EIA/TIA Interim Standard,* "Cellular System Dual-Mode Mobile Station-Base Station Compatibility Standard", IS-54, May 1990, published by the Electronic Industries Association, 2001 Pennsylvania Ave., N W , Washington, D.C. 20006 (hereinafter referred to as "IS-54" and hereby incorporated by reference herein).

SUMMARY OF THE INVENTION

In one aspect the system of the invention includes the generation of a plurality of parameters for use in enhancing the security of communication in a digital cellular communications system in which each mobile station is assigned a unique multi-digit secret permanent key and in which a periodically changed multi-digit rolling key is employed for increased security. Both the permanent key and the rolling key are stored in each mobile station and the home network of the mobile. A plurality of multi-digit input signals are used which include a signal representative of a random authentication inquiry from a visited network and a signal representative of a particular mobile station along with the multi-digit permanent key of the particular mobile station and the multi-digit rolling key associated with the particular mobile at that particular time. The digits of the input signals are arranged in a first grouping and from that grouping of input signals and the permanent and rolling key digits a first output value is calculated in accordance with a first algorithm. Sequentially arranged blocks of digits comprising said first output value are assigned to selected parameters for use within the system, including, an authentication response to be used by the mobile station to reply to the authentication inquiry by the visited network and an authentication signal to be used by the visited network to authenticate it to the mobile station. The digits of the input signals are then arranged in a second grouping and from that grouping of input signals and the permanent and rolling key digits a second output value is calculated in accordance with a second algorithm. Sequentially arranged blocks of digits comprising said second output value are assigned to selected parameters for use within said system, including, a security key to be used to calculating a keystream of pseudo-random bits for enciphering communications data within the system and a new rolling key to be associated with the particular mobile at a next particular time.

In another aspect of the invention, certain random numbers used in the first and second algorithms are obtained from a look-up table which is also used to obtain random numbers used in an algorithm for calculating a pseudo-random bit stream for enciphering communications data within the system.

In still another aspect of the invention, there is included a system for implementing a digital cellular communications system which includes communications traffic encryption along with bilateral authentication and encryption key generation.

BRIEF DESCRIPTION OF THE DRAWINGS

The present invention will be better understood and its numerous objects and advantages will become apparent to those skilled in the art by reference to the following drawings in which.

DETAILED DESCRIPTION OF THE PREFERRED EMBODIMENT

Digital Cellular System

Figure 1:
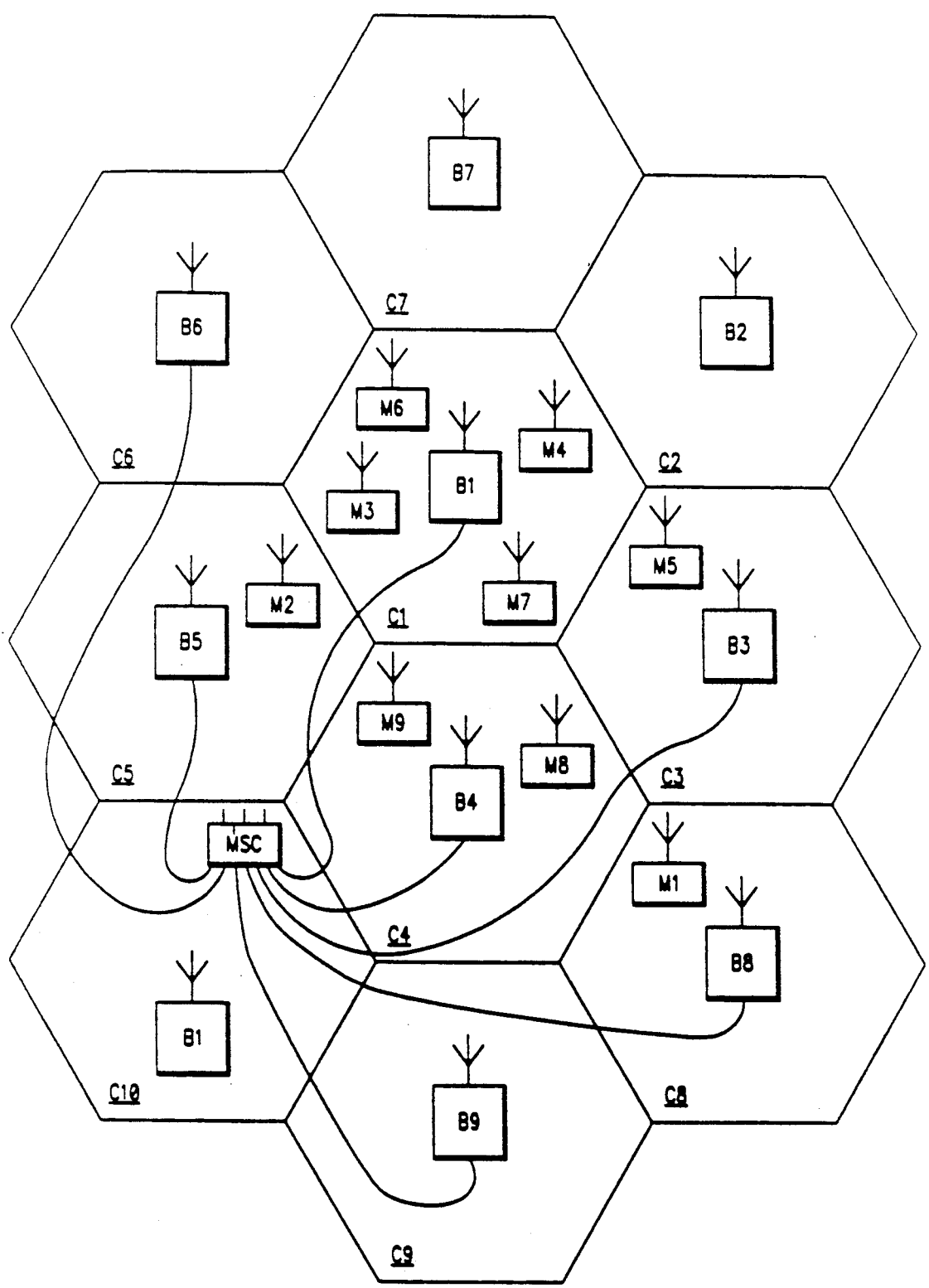
FIG. 1 is a pictorial representation of a cellular radio communications system including a mobile switching center, a plurality of base stations and a plurality of mobile stations.

Referring first to FIG. 1, there is illustrated therein a conventional cellular radio communications system of a type to which the present invention generally pertains. In FIG. 1, an arbitrary geographic area may be seen divided into a plurality of contiguous radio coverage areas, or cells, C1–C10. While the system of FIG. 1 is shown to include only 10 cells, it should be clearly understood that, in practice, the number of cells may be much larger.

Associated with and located within each of the cells C1–C10 is a base station designated as a corresponding one of a plurality of base stations B1–B10. Each of the base stations B1–B10 includes a transmitter, a receiver and controller as is well known in the art. In FIG. 1, the base stations B1–B10 are located at the center of the cells C1–C10, respectively, and are equipped with omni-directional antennas. However, in other configurations of the cellular radio system the base stations B1–B10 may be located near the periphery, or otherwise away from the centers of the cells C1–C10 and may illuminate the cells C1–C10 with radio signals either omni-directionally or directionally. Therefore, the representation of the cellular radio system of FIG. 1 is for purposes of illustration only and is not intended as a limitation on the possible implementations of the cellular radio system.

With continuing reference to FIG 1, a plurality of mobile stations M1–M10 may be found within the cells C1–C10. Again, only ten mobile stations are shown in FIG. 1 but it should be understood that the actual number of mobile stations may be much larger in practice and will invariably exceed the number of base stations. Moreover, while none of the mobile stations M1–M10 may be found in some of the cells C1–C10, the presence or absence of the mobile stations M1–M10 in any particular one of the cells C1–C10 should be understood to depend, in practice, on the individual desires of each of the mobile stations M1–M10 who may roam from one location in a cell to another or from one cell to an adjacent or neighboring cell.

Each of the mobile stations M1–M10 is capable of initiating or receiving a telephone call through one or more of the base stations B1-B10 and a mobile switching center MSC. The mobile switching center MSC is connected by communications links, e.g. cables, to each of the illustrative base stations B1-B10 and to the fixed public switching telephone network (PSTN), not shown, or a similar fixed network which may include an integrated system digital network (ISDN) facility. The relevant connections between the mobile switching center MSC and the base stations B1-B10, or between the mobile switching center MSC and the PSTN or ISDN, are not completely shown in FIG. 1 but are well known to those of ordinary skill in the art. Similarly, it is also known to include more than one mobile switching center in a cellular radio system and to connect each additional mobile switching center to a different group of base stations and to other mobile switching centers via cable or radio links.

Each of the cells C1-C10 is allocated a plurality of voice or speech channels and at least one access or control channel. The control channel is used to control or supervise the operation of mobile stations by means of information transmitted to and received from those units. Such information may include incoming call signals, outgoing call signals, page signals, page response signals, location registration signals, voice channel assignments, maintenance instructions and "handoff" instructions as a mobile station travels out of the radio coverage of one cell and into the radio coverage of another cell. The control or voice channels may operate either in an analog or a digital mode or a combination thereof. In the digital mode, analog messages, such as voice or control signals, are converted to digital signal representations prior to transmission over the RF channel. Purely data messages, such as those generated by computers or by digitized voice devices, may be formatted and transmitted directly over a digital channel.

In a cellular radio system using time division multiplexing (TDM), a plurality Of digital channels may share a common RF channel. The RF channel is divided into a series of "time slots", each containing a burst of information from a different data source and separated by guard time from one another, and the time slots are grouped into "frames" as is well known in the art. The number of time slots per frame varies depending on the bandwidth of the digital channels sought to be accommodated by the RF channel. The frame may, for example, consist of three (3) time slots, each of which is allocated to a digital channel. Thus, the RF channel will accommodate three digital channels. In one embodiment of the present invention discussed herein, a frame is designated to comprise three time slots. However, the teachings of the present invention should be clearly understood to be equally applicable to a cellular radio system utilizing any number of time slots per frame.

Mobile Station

Figure 2:
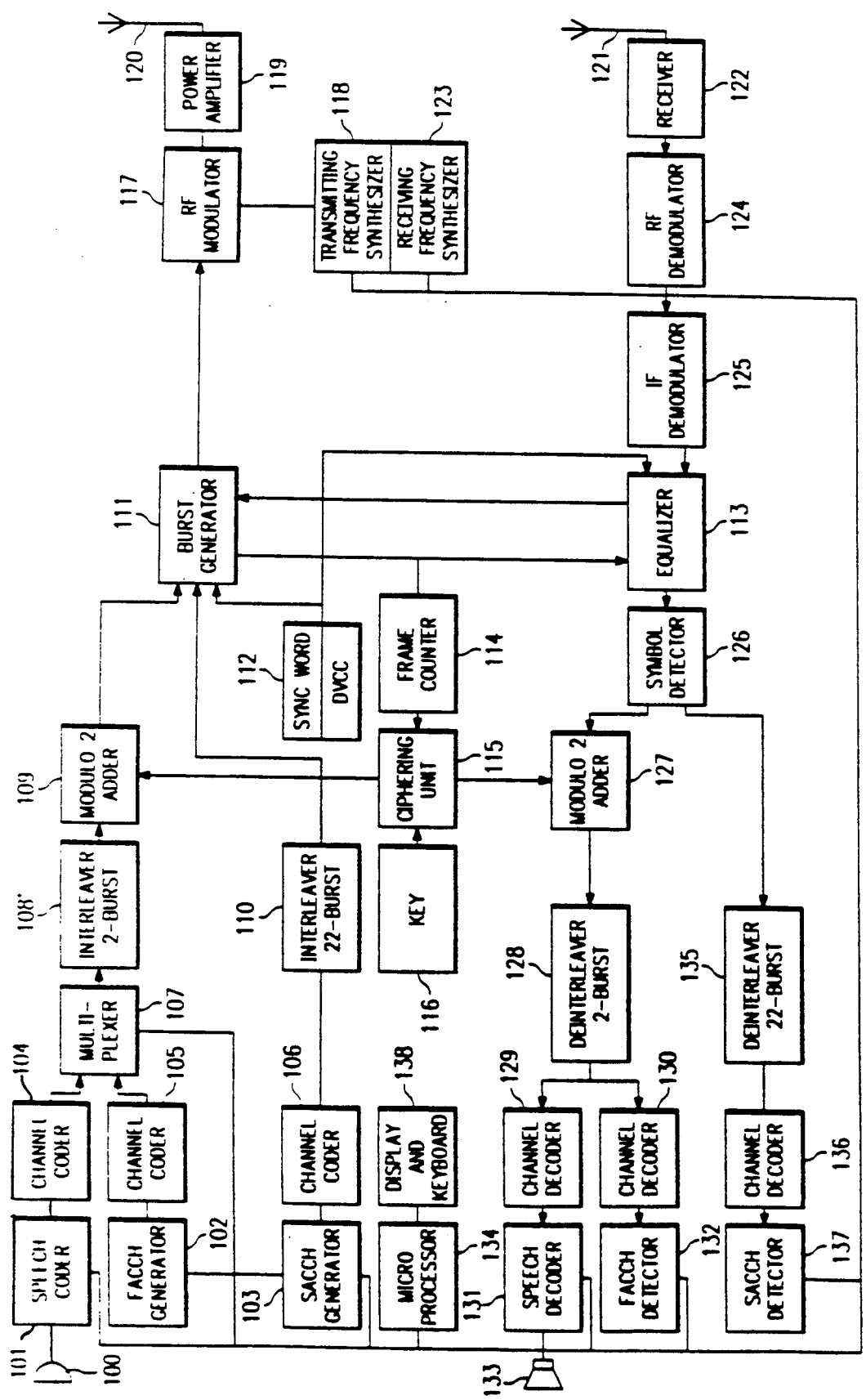
FIG. 2 is a schematic block diagram of mobile station equipment used in accordance with one embodiment of the system of the present invention.

Referring next to FIG. 2, there is shown therein a schematic block diagram of the mobile station equipment which are used in accordance with one embodiment of the present invention. The equipment illustrated in FIG. 2 may be used for communication over digital channels. A voice signal detected by a microphone 100 and destined for transmission by the mobile station is provided as input to a speech coder 101 which converts the analog voice signal into a digital data bit stream. The data bit stream is then divided into data packets or messages in accordance with the time division multiple access (TDMA) technique of digital communications. A fast associated control channel (FACCH) generator 102 exchanges control or supervisory messages with base station in the cellular radio system. The conventional FACCH generator operates in a "blank and burst" fashion whereby a user frame of data is muted and the control message generated by the FACCH generator 102 is transmitted instead at a fast rate.

In contrast to the blank and burst operation of the FACCH generator 102, a slow associated control channel (SACCH) generator 103 continuously exchanges control messages with the base station. The output of the SACCH generator is assigned a fixed length byte e.g. 12 bits, and included as a part of each time slot in the message train (frames). Channel coders 104, 105, 106 are connected to the speech coder 101, FACCH generator 102 and SACCH generator 103, respectively. Each of the channel coders 104, 105, 106 performs error detection and recovery by manipulating incoming data using the techniques of convolutional encoding, which protects important data bits in the speech code, and cyclic redundancy check (CRC), wherein the most significant bits in the speech coder frame, e.g , 12 bits, are used for computing a 7 bit error check.

Referring again to FIG. 2, the channel coders 104, 105 are connected to a multiplexer 107 which is used for time division multiplexing of the digitized voice messages with the FACCH supervisory messages. The output of the multiplexer 107 is coupled to a 2-burst interleaver 108 which divides each data message to be transmitted by the mobile station (for example, a message containing 260 bits) into two equal but separate parts (each part containing 130 bits) arranged in two consecutive time slots. In this manner, the deteriorative effects of Rayleigh fading may be significantly reduced. The output of the 2-burst interleaver 108 is provided as input to a modulo-2 adder 109 where the data to be transmitted is ciphered on a bit-by-bit basis by logical modulo-2 addition with a pseudo-random keystream which is generated in accordance with the system of the present invention described below.

The output of the channel coder 106 is provided as input to a 22-burst interleaver 110. The 22-burst interleaver divides the SACCH data into 22 consecutive time slots, each occupied by a byte consisting of 12 bits of control information. The interleaved SACCH data forms one of the inputs to a burst generator 111. Another input to the burst generator 111 is provided by the output of the modulo-2 adder 109. The burst generator ill produces "message bursts" of data, each consisting of a time slot identifier (TI), a digital voice color code (DVCC), control or supervisory information and the data to be transmitted, as further explained below.

Transmitted in each of the time slots in a frame is a time slot identifier (TI), which is used for time slot identification and receiver synchronization, and a digital voice color code (DVCC), which ensures that the proper RF channel is being decoded. In the exemplary frame of the present invention, a set of three different 28-bit TIs is defined, one for each time slot while an identical 8-bit DVCC is transmitted in each of the three time slots. The TI and DVCC are provided in the mobile station by a sync word/DVCC generator 112 connected to the burst generator 111 as shown in FIG. 2. The burst generator 111 combines the outputs of the modulo-2 adder 109, the 22-burst interleaver 110 and the sync word/DVCC generator 112 to produce a series of message bursts, each comprised of data (260 bits), SACCH information (12 bits), TI (28 bits), coded DVCC (12 bits) and 12 delimiter bits for a total of 324 bits which are integrated according to the time slot format specified by the EIA/TIA IS-54 standard.

Each of the message bursts is transmitted in one of the three time slots included in a frame as discussed hereinabove. The burst generator 111 is connected to an equalizer 113 which provides the timing needed to synchronize the transmission of one time slot with the transmission of the other two time slots. The equalizer 113 detects timing signals sent from the base station (master) to the mobile station (slave) and synchronizes the burst generator 111 accordingly. The equalizer 113 may also be used for checking the values of the TI and the DVCC. The burst generator 111 is also connected to a 20 ms frame counter 114 which is used to update a ciphering code that is applied by the mobile station every 20 ms, i.e., once for every transmitted frame. The ciphering code is generated by a ciphering unit 115 with the use of a mathematical algorithm and under the control of a key 116 which is unique to each mobile station. The algorithm may be used to generate a pseudo-random keystream in accordance with the present invention and as discussed further below.

The message bursts produced by the burst generator 110 are provided as input to an RF modulator 117. The RF modulator 117 is used for modulating a carrier frequency according to the $\pi/4$-DQPSK technique ($\pi/4$ shifted differentially encoded quadrature phase shift key). The use of this technique implies that the information to be transmitted by the mobile station is differentially encoded, i.e., two bit symbols are transmitted as 4 possible changes in Phase: $+$ or $-\pi/4$ and $+$ or $-3\pi/4$. The carrier frequency for the selected transmitting channel is supplied to the RF modulator 117 by a transmitting frequency synthesizer 118. The burst modulated carrier signal output of the RF modulator 117 is amplified by a power amplifier 119 and then transmitted to the base station through an antenna 120.

The mobile station receives burst modulated signals from the base station through an antenna 121 connected to a receiver 122. A receiver carrier frequency for the selected receiving channel is generated by a receiving frequency synthesizer 123 and supplied to a an RF demodulator 124. The RF demodulator 124 is used to demodulate the received carrier signal into an intermediate frequency signal. The intermediate frequency signal is then demodulated further by an IF demodulator 125 which recovers the original digital information as it existed prior to $\pi/4$-DQPSK modulation. The digital information is then passed through the equalizer 113 to a symbol detector 126 which converts the two-bit symbol format of the digital data provided by the equalizer 114 to a single bit data stream.

The symbol detector 126 produces two distinct outputs: a first output, comprised of digitized speech data and FACCH data, and a second output, comprised of SACCH data. The first output is supplied to a modulo-2 adder 127 which is connected to a 2-burst deinterleaver 128. The modulo-2 adder 127 is connected to the ciphering unit 115 and is used to decipher the4 encrypted transmitted data by subtracting on a bit-by-bit basis the same pseudo-random keystream used by the transmitter in the base station encrypt the data and which is generated in accordance with the teachings of the present invention set forth below. The modulo-2 adder 127 and the 2-burst deinterleaver 128 reconstruct the speech-/FACCH data by assembling and rearranging information derived from two consecutive frames of the digital data. The 2-burst deinterleaver 128 is coupled to two channel decoders 129, 130 which decode the convolutionally encoded speech/FACCH data using the reverse process of coding and check the cyclic redundancy check (CRC) bits to determine if any error has occurred. The channel decoders 129, 130 detect distinctions between the speech data on the one hand, and any FACCH data on the other, and route the speech data and the FACCH data to a speech decoder 131 and an FACCH detector 132, respectively. The speech decoder 131 processes the speech data supplied by the channel decoder 129 in accordance with a speech coder algorithm, e.g. VSELP, and generates an analog signal representative of the speech signal transmitted by the base station and received by the mobile station. A filtering technique may then be used to enhance the quality of the analog signal prior to broadcast by a speaker 133. Any FACCH messages detected by the FACCH detector 132 are forwarded to a microprocessor 134.

The second output of the symbol detector 126 (SACCH data) is supplied to a 22-burst deinterleaver 135. The 22-burst interleaver 135 reassembles and rearranges the SACCH data which is spread over 22 consecutive frames. The output of the 22-burst deinterleaver 135 is provided as input to a channel decoder 136. FACCH messages are detected by an FACCH detector 137 and the control information is transferred to the microprocessor 134.

The microprocessor 134 controls the activities of the mobile station and communications between the mobile station and the base station. Decisions are made by the microprocessor 134 in accordance with messages received from the base station and measurements performed by the mobile station. The microprocessor 134 is also provided with a terminal keyboard input and display output unit 138. The keyboard and display unit 138 allows the mobile station user to exchange information with the base station.

Base Station

Figure 3:
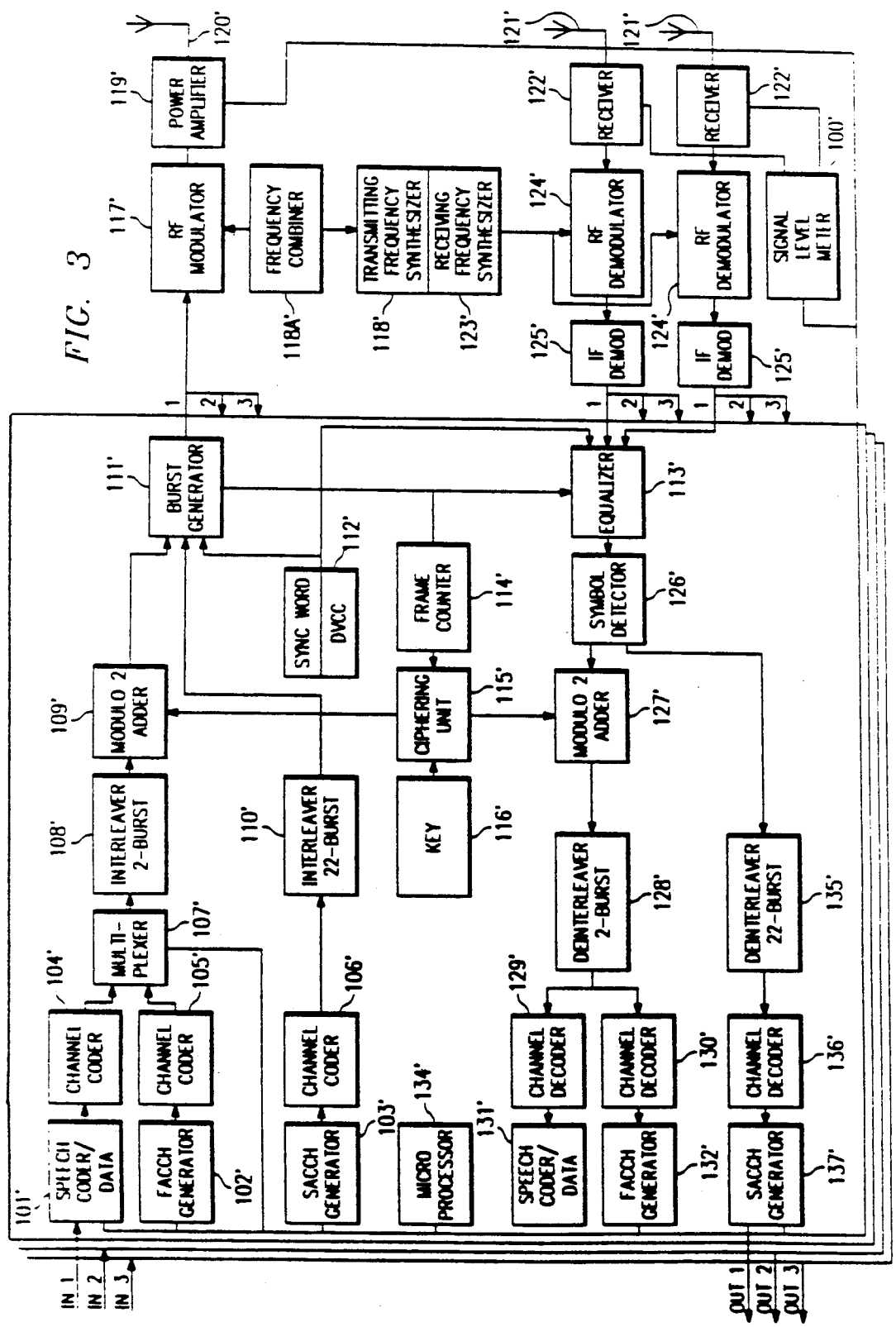
FIG. 3 is a schematic block diagram of base station equipment used in accordance with one embodiment of the system of the present invention.

Referring next to FIG. 3, there is shown a schematic block diagram of the base station equipment which are used in accordance with the present invention. A comparison of the mobile station equipment shown in FIG. 2 with the base station equipment shown in FIG. 3 demonstrates that much of the equipment used by the mobile station and the base station are substantially identical in construction and function. Such identical equipment are, for the sake of convenience and consistency, designated with the same reference numerals in FIG. 3 as those used in connection with FIG. 2, but are differentiated by the addition of a prime (') in FIG. 3.

There are, however, some minor differences between the mobile station and the base station equipment. For instance, the base station has, not just one but, two receiving antennas 121'. Associated with each of the receiving antennas 121' are a receiver 122', an RF demodulator 124', and an IF demodulator 125'. Furthermore, the base station includes a programmable frequency combiner 118A' which is connected to a transmitting frequency synthesizer 118'. The frequency combiner 118A' and the transmitting frequency synthesizer 118' carry out the selection of the RF channels to be used by the base station according to the applicable cellular frequency reuse plan. The base station, however, does not include a user keyboard and display unit similar to the user keyboard and display unit 138 present in the mobile station. It does however include a signal level meter 100' connected to measure the signal received from each of the two receivers 122' and to provide an output to the microprocessor 134'. Other differences in equipment between the mobile station the base station may exist which are well known in the art.

The discussion thus far has focused on the operational environment of the system of the present invention. A specific description of particular embodiments of the present invention are set forth below. As disclosed above and used hereinafter, the term "keystream" means a pseudo-random sequence of binary bits or blocks of bits used to encipher a digitally encoded message or data signal prior to transmission or storage in a medium which is susceptible to unauthorized access, e.g., an RF channel. A "keystream generator" means a device which generates a keystream by processing a secret key comprised of a plurality of bits. Encryption may be simply performed by a modulo-2 addition of the keystream to the data to be encrypted. Similarly, decryption is performed by a modulo-2 subtraction of an identical copy of the keystream from the encrypted data.

Keystream Generation

Generally speaking, the keystream generator provides a mechanism, represented by elements 115 and 115' of FIGS. 2 and 3, respectively, for expanding a relatively small number of secret bits, i.e., the secret key, represented by elements 116 and 116', into a much larger number of keystream bits which are then used to encrypt data messages prior to transmission (or storage). To decrypt an encoded message, the receiver must "know" the index to the keystream bits used to encrypt the message. In other words, the receiver must not only have the same keystream generator and generate the same keystream bits as the transmitter, but also, the receiver keystream generator must be operated in synchronism with the transmitter keystream generator if the message is to be properly decoded. Synchronization is normally achieved by periodically transmitting from the encoding system to the decoding system the contents of every internal memory device, such as bit, block or message counters, which participate in the generation of the keystream bits. Synchronization may be simplified, however, by using arithmetic bit block counters, such as binary counters, and incrementing those counters by a certain amount each time a new block of keystream bits is produced. Such counters may form a part of a real-time, i.e. hours, minutes and seconds, clock chain. A keystream generator relying on the latter type of counters is known as the "time-of-day" driven keystream generator to which reference was made hereinabove.

It should be noted that the precise method used for bit-by-bit or block-by-block advancing of the keystream generator, and the particular method used for synchronizing the sending circuit with the receiving circuit, are the subject of co-pending patent application Ser. No. 07/556,102, entitled "Continuous Cipher Synchronization for Cellular Communication System", as mentioned above. The system of the present invention, as hereinafter described in detail, is directed to the efficient implementation of an effective encryption system which may be used, for example, to secure digital communication over RF channels in a cellular telecommunications system. The encryption system includes a keystream generator which produces a high number of keystream bits per second by performing a large number of boolean operations per second on a plurality of key bits contained in a secret key. The keystream generator of the present invention may be implemented with an integrated circuit having a simple microprocessor architecture.

Figure 4:
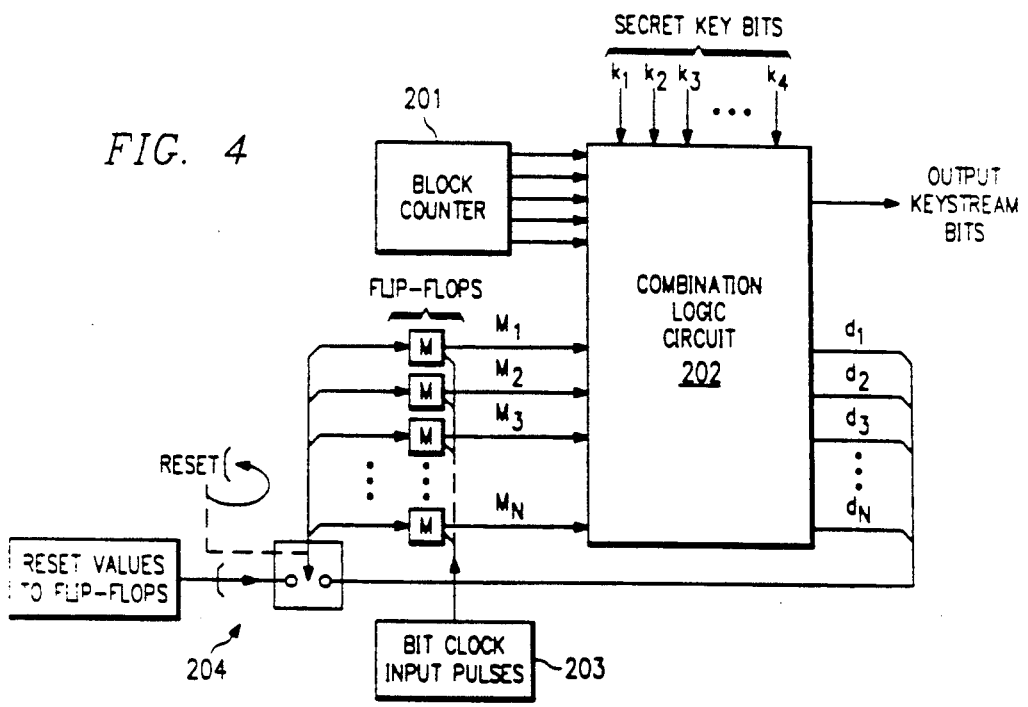
FIG. 4 is a schematic block diagram of a prior art keystream generator.

Referring now to FIG. 4, a schematic block diagram of a prior art keystream generator may now be seen. An optional block counter 201 provides a first multi-bit input to a combinatorial logic circuit 202. A plurality of one-bit memory elements, or flip-flops, m1, m2, m3 ... mn provides a second multi-bit input to the combinatorial logic circuit 202. A portion of the output of the combinatorial logic circuit 202, consisting of one-bit outputs d1, d2, d3 ... dn, is fed back to the flip-flops m1-mn. The outputs d1-dn become the next state of the flip-flops m1-mn, respectively after each clock pulse in a series of bit clock input pulses 203 supplied to the flip-flops m1-mn. By suitable construction of the combinatorial logic circuit 202, the flip-flops m1-mn may be arranged to form a straight binary counted a linear feedback shift register executing a maximum length sequence, or any other form of linear or non-linear sequential counters. In any event, each of the states of the flip-flops m1-mn and the state of the block counter 201 at the receiver end must be made equal to the states of the corresponding elements at the transmitter end. A reset or synchronization mechanism 204 is used to synchronize the receiver with the transmitter.

With continuing reference to FIG. 4, a plurality of secret key bits k1, k2, k3 ... kn, forms a third multi-bit input to the combinatorial logic circuit 202. The number n of secret key bits is usually in the region of a hundred bits plus or minus ($+/-$) a factor of 2. It is desirable that each of the secret key hits k1-kn should at a minimum, have the potential of affecting each of the bits in the keystream. Otherwise, an eavesdropper would need to break only a small sunset of the secret key bits k1-kn in order to decipher and monitor the encrypted data. The risk of unauthorized interception, however, may be considerably reduced if the value (logical state) of each bit in the keystream is made to depend not only on the value of a particular secret key bit, but also on the value of all other secret key bits as well as the state of the block counter 201 and other internal memory states. Heretofore, the establishment of such a dependence Would have entailed a prohibitive number of boolean operations. Assume, for example, that the secret key is composed of one hundred (100) secret key bits. If each of these secret key bits is to influence every bit in the keystream, a total of one hundred (100) combinatorial operations per keystream bit would be required. Thus, to produce ten thousand (10,000) keystream bits, a total of one million (1,000,000) combinatorial operations would be required and the number would be even greater if each keystream bit was also made to depend on on one or more internal memory states. One of the objectives of the present invention is to significantly reduce the required number of combinatorial operations per keystream bit while maintaining the dependence of each keystream bit on every one of the secret key bits.

The production of many thousands of pseudo-random keystream bits from, for example, fifty (50) to one hundred (100) secret key bits may be viewed as a multi-stage expansion process. A plurality of expansion stages are cascaded together, each having a successively smaller expansion ratio. Expansion by the first stage is performed less frequently than by subsequent stages in offer to minimize the number of required logical (boolean) operations per keystream bit. Additionally the first expansion stage is constructed to provide a plurality of output bits which is highly dependent on the secret key bits, further reducing the number of logical operations which must be performed by the subsequent stages.

Figure 5:
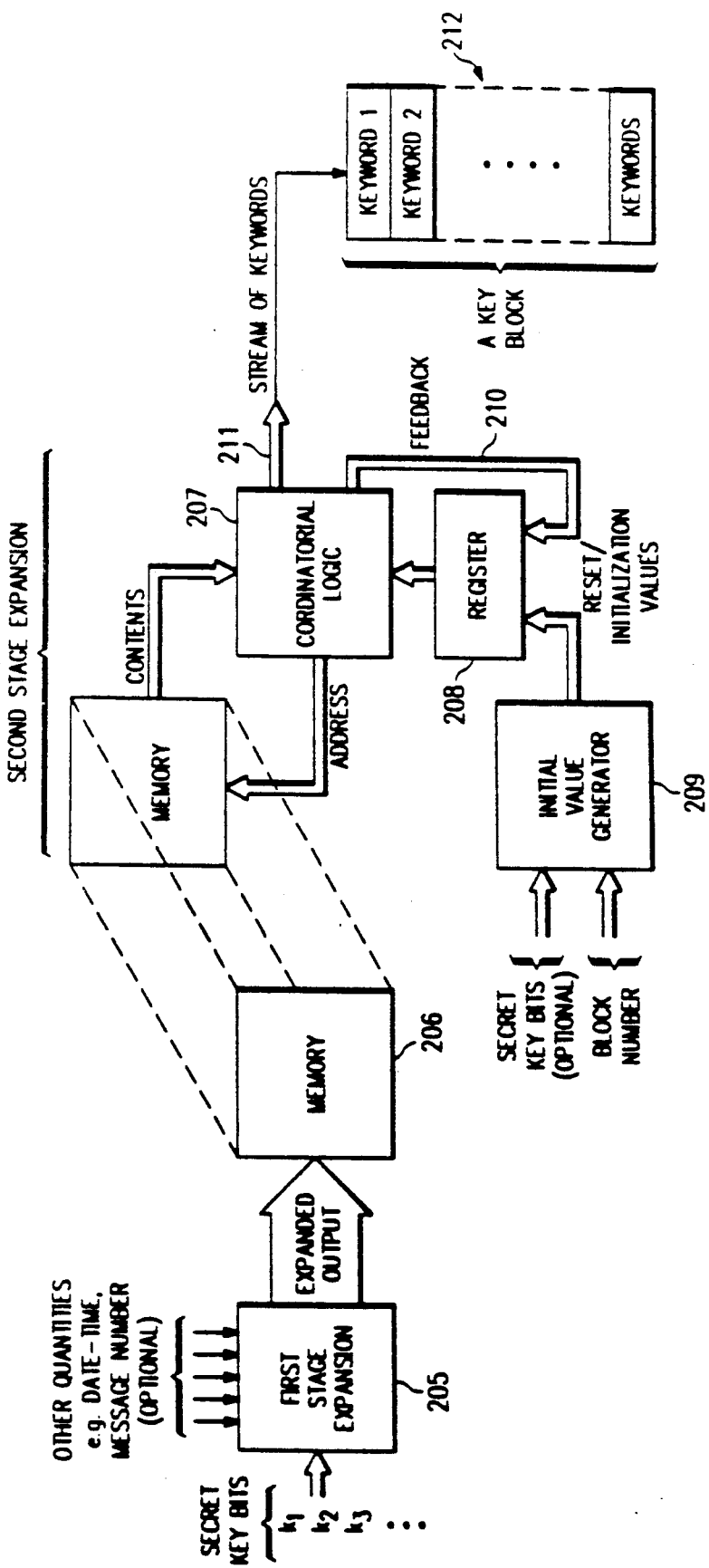
FIG. 5 is a schematic block diagram Of a keystream generator circuit of an encryption system constructed in accordance with the present invention.

Referring next to FIG. 5, there is shown a schematic block diagram of a keystream generator system. A plurality of security key bits k1, k2, k3 . . . are provided as input to a first stage expansion 205. The security key bits may be obtained from the permanent key bits by an authentication algorithm as set forth in further detail below. The security key bits k1, k2, k3 . . . input may include some, but preferably all, of the security key bits k1, k2, k3 . . . kn, hereinafter sometimes referred to as "secret" key bits. Additional, or optional, inputs to the first stage expansion 205 may include the outputs of a message counter, a block counter, a date-time stamp representing the time or block count number at the start of a frame, or other variable outputs which may be synchronized by the sender and receiver. Any internal memory output which varies slowly with time may be used as an input to the first stage expansion 205. A slow changing input is desired because the first stage expansion 205 should be performed infrequently, e.g., once per message.

The first stage expansion 205 generates an expanded output which is considerably larger in size than the number of secret key bits k1, k2, k3 . . . The expanded output is stored in a memory device 206 which is accessed by a combinatorial logic circuit 207. The combinatorial logic 207 performs a second stage expansion as more fully set forth below. The output of a counter or register 208 forms an input to the combinatorial logic 207. The register 208 is initialized to a new starting state prior to the generation of each block of keystream bits. An initial value generator 209 provides the starting state for the register 208. The starting state, which will be different for each particular block of keystream bits, is a function of the block number of the particular block and, possibly, also a function of some subset of the secret key bits k1-kn.

A first output 210 of the combinatorial logic 207 is fed back to the register 208. The output 210 becomes the new state of the register 208 after each cycle of operation. A second output 211 of the combinatorial logic 207 forms the keystream bits which are to be mixed with the data stream as shown in FIGS. 2 and 3, above. The number of keystream bits produced per cycle at the output 211 may be any multiple of 2, i.e, 8, 16, 32, 56, etc. Such bits are collectively referred to as a "keyword". Some or all of the keywords produced at the output 211 prior to reinitialization of the register 208 are grouped into a keyblock 212. The keyblock 212 may, for example, consist of all the keywords produced in every cycle, or in every other cycle, preceding reinitialization of the register 208.

It will be appreciated by those skilled in the art that a conventional implementation Of the keystream generator system depicted in FIG. 5 and discussed above might require a host of complex combinatorial logic circuits which, if realized separately by interconnecting a plurality of logic gates, i.e, AND, OR etc., would amount to a large and costly chip, useful only for a very specific application. An arithmetic and logic unit (ALU), on the other hand, is a standard component of a variety of small, low-cost and multi-purpose microprocessors. The present invention provides a means for realizing all of the required combinatorial logic functions with the use of such an ALU.

The conventional ALU, operating under the control of a program, can perform the combinatorial functions ADD, SUBTRACT, BITWISE EXCLUSIVE OR, AND, OR between any two 8-bit or 16-bit binary words. If the ALU is used to sequentially implement all of the boolean functions required in the device of FIG. 5, the ALU operating speed, measured in terms of the number of complete cycles per second that may be executed, would be substantially reduced. The multistage expansion used in the present system, however, prevents such excessive reduction of ALU speed by minimizing the number of program instructions, i.e., instances of ALU utilization, per cycle for the most frequently executed combinatorial logic 207 through the infrequently periodic calculation of a large number Of key-dependent functions in the first stage expansion 205. By the word "large" in the preceding sentence, is meant, for example, an order of magnitude larger than the number n of secret key bits.

Once the register 208 is initialized with a starting value, the combinatorial logic 207 will generate a stream of keywords at the output 211 and Will continue to generate additional keywords each time the register 208 is reloaded with the feedback value at the output 210. Difficulties may arise, however, which can undermine the integrity of the keyword generation process. If, for example, the contents of the register 208 ever return to their initial value, the sequence of the keywords generated theretofore will repeat again. Similarity, if the contents of the register 208 return to a value (not necessarily the initial value) previously encountered in the generation of the current keyblock, the system is said to be "short cycling". For reasons alluded to earlier, e.g., the ease of unauthorized deciphering, it is undesirable that the sequence of keywords should begin to repeat, or that short cycling should occur, within the generation of a single keyblock. Moreover, if the contents of the register 208 at some point, say after the m'th keyword is generated, become equal to some value which existed or will exist after the m'th keyword during the generation of another keyblock, the two keyblocks will, from that point on, be identical—also an undesirable occurrence.

Hence, the combinatorial logic 207 and the associated register 208 (the "combinatorial logic/register combination"), when operated successively a number of times, should (i) not produce cycles shorter than the number of keywords per block; and (ii) produce a unique keyword sequence for every unique starting state of the register 208. To meet the latter requirement, no two different starting states should be capable of converging to the same state. Furthermore, both of the foregoing requirements should apply regardless of the contents of the memory 206. As explained in more detail below, the present invention alleviates these concerns and enhances the integrity of the keyword generation process.

When the state transition diagram of the combinatorial logic/register combination has converging forks, the combination may not be run in reverse through such a fork because of the ambiguity about which path to take. Therefore, if a process for operating the combination can be shown to be unambiguous or reversible, it is proof that converging forks do not exist in the state transition diagram. Such a process is described and discussed below.

Figure 6:
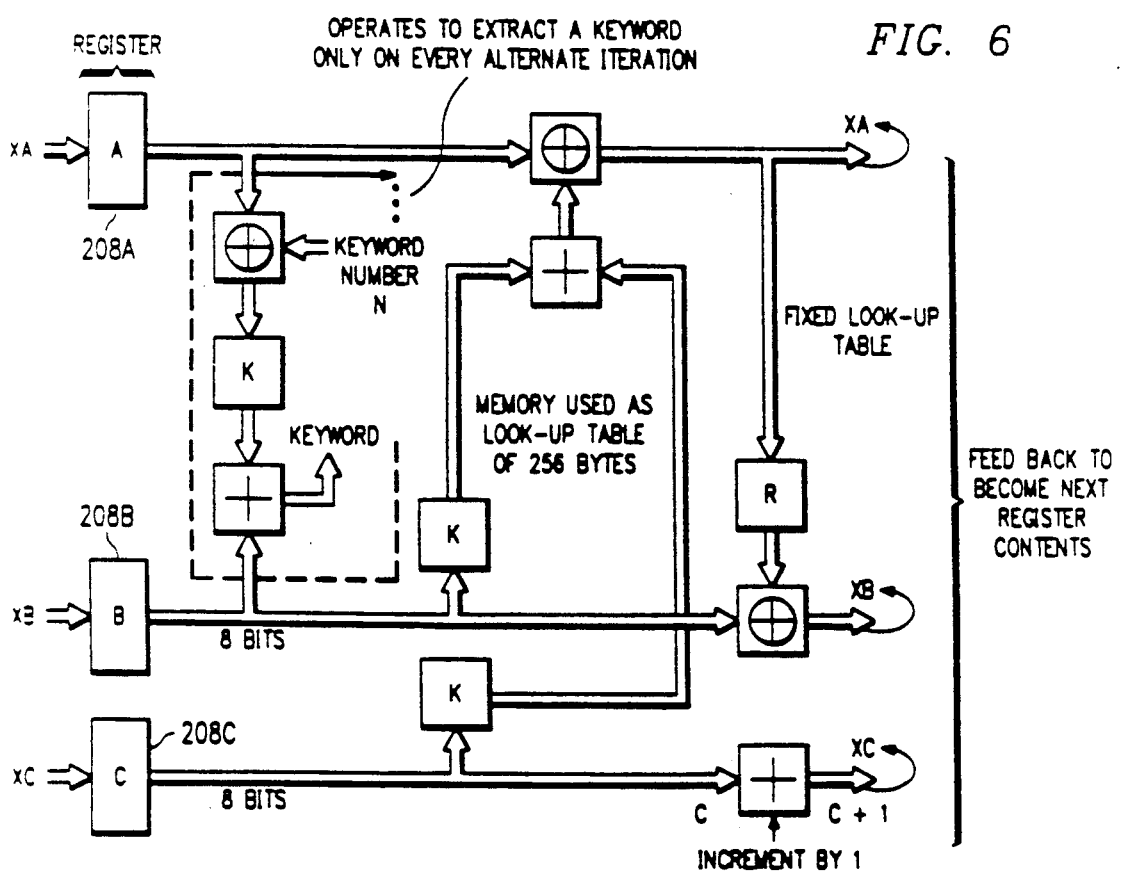
FIG. 6 is a partial schematic block diagram of a second expansion stage of the keystream generator shown in FIG. 5.

Referring next to FIG. 6, a partial schematic block diagram of the second expansion stage of the keystream generator shown in FIG. 5 may now be seen. The register 208 of FIG. 5 has been divided into three byte-length registers 208A, 208B, 208C in FIG. 6. The registers 208A, 208B, 208C may be, for example, 8-bit registers. Following initialization of the registers 208A, 208B, and 208C, new state values are calculated from the following formulas:

$$A' = A \# [K(B) + K(C)] \quad (1)$$

$$B' = B \# R(A) \quad (2)$$

$$C' = C + 1 \quad (3)$$

where,

A' is the new state value for the register 208A;
B' is the new state value for the register 208B;
C' is the new state value for the register 208C;
A is the current state value for the register 208A;
B is the current state value for the register 208B;
C is the current state value for the register 208C;
+ means word-length modulo additions, for example, byte wide modulo-256 additions;
# means +(as defined above) or bitwize EXclusive OR (XOR);
K(B) is the value K located at address B of the memory 206 shown in FIG. 5;
K(C) is the value K located at address C of the memory 206 shown in FIG. 5;

It should be noted that each of the values K stored in the memory 206 has been previously calculated to be a complex function of all the secret keybits by the first stage expansion 205 shown in FIG. 5. R(A) is the value located at address A in a fixed look-up table R which may be the same tible which is described below in connection with the contents of the S-Box use in the authentication algorithm. Alternatively, the bits of A are supplied as inputs to a combinatorial logic block which will produce an output R. The look-up table R, or alternatively, the combinatorial logic block should provide a number of output hits greater or equal to the word length of A and less or equal to the word length of B. In the case where A and B are both 8-bit bytes, for example, R will also be an 8-bit byte and the look-up table R will contain 256 values.

The value R should have a 1:1 mapping from input to output; that is, each possible state Of the input bits should map to a unique output value. This ensures that the R function is reversible which, in turn, ensures that the whole process may be reversed by means Of the following relationships:

$$C = C - 1 \quad (1)$$

$$B = B \# \# R'(A) \quad (2)$$

$$A = A \# \# [K(B) + K(C)] \quad (3)$$

where,

− means word-length modulo subtraction;
## means the inverse operation of #, i.e., either − (as defined above) or bitwise XOR; and
R' is the inverse of the 1:1 look-up table, or the combinatorial logic, R.

This reversibility demonstrates that there are no converging forks in the state transition diagram of the combinatorial logic/register combination and, hence, guarantees that every starting state will produce a unique sequence of keywords. Furthermore, the process guarantees a minimum cycle length, since C is incremented only by 1 and will not return to its initial value until after $2^w$ iterations, where w is the word length used. For example, if all of the values A, B, C, R and K are 8-bit bytes, the minimum cycle length will be 256. If, upon every iteration (cycle), a keyword (byte) is extracted a total of 256 bytes may be extracted without the danger of premature repetition of the sequence. If, on the other hand, the keyword is extracted every other iteration a total of 128 keywords may be extracted without premature repetition of the sequence. By the word "extracted" in the preceding two sentences, is meant the collection and placement of keywords into a keyblock such as the keyblock 212 in FIG. 5. A particular method of keyword extraction which may be used in the present invention is described immediately below.

In connection with FIG. 6, a process was described for computing the outputs 210 of the combinatorial logic 207 which are fed back to the register 208. Generally speaking, any one of the intermediate quantities A, B or C may be directly extracted and used as a keyword on each iteration. Letting S = (A, B, C) stand for the current state of the combinatorial logic/register combination, the combination will transit through a sequence of states S0, S1, S2, S3, S4, S5, S6, S7 ... following initialization to S0. If, however, in the computation of a subsequent keyblock the register 208 is initialized, for example, to S2, the resulting sequence S2, S3, S4, S5, S6, S7 ... will be identical to the first sequence but shifted by two keywords (S0, S1). Therefore, if a value A, B, or C from a state S is directly used as a keyword, such an identity may appear between different keyblocks. To prevent this, the system of the present invention modifies each of the values extracted in accordance with the value's position in the keyblock so that if the same value is extracted to a different keyword position in another block, a different keyword will result. An exemplary method for achieving the latter objective is set forth below.

Let N be the number of keywords in the keyblock currently being computed and S = (A, B, C) be the current state of the register 208 in the iteration during which the keyword N is to be extracted. The value of the keyword W(N) may be calculated as follows:

$$W(N) = B + K[A + N]$$

where,
+ means XOR;
+' means either + (as defined immediately above) or word length-modulo addition.

Other suitable exemplary methods for keyword extraction may include the following:

$$W(N) = B + K[R(A + N)] \text{ or}$$

$$W(N) = R[A + N] + K[B + N] \text{ and so forth.}$$

It is recommended that, to obtain the best cryptographic properties in the system, the values of the keywords extracted should be a function of their respective positions within a keyblock.

Having described an encryption system which generates a large number of complex, key-dependent pseudo-random (PR) bits for use in enciphering data and which may be implemented in a conventional microprocessor, a description of a system which integrates the encryption and authentication functions and improves the overall security of a digital cellular system is set forth immediately below.

Authentication

The process of authentication according to the present invention generally involves the following sequence of steps:

(1) The mobile station identifies itself to the network by sending a mobile identification number (MIN) in unencrypted form so that the network can retrieve information pertaining to that mobile, e.g , security keys, from the location or database in which they are stored.

(2) The network transmits a random challenge signal (RAND) to the mobile.

(3) The mobile station and the network each uses bits of a secret permanent authentication key, known only to the mobile station and the network and never transmitted over the air, in order to compute a response signal (RESP) to the RAND in accordance with a published algorithm (referred to hereinafter as AUTH1). The RESP generated at the mobile station is transmitted to the network.

(4) The network compares the RESP received from the mobile station with the internally generated version and grants the mobile station access for registration, initiation of a call or reception of a call only if the comparison succeeds.

In IS-54, the MIN is a 34-bit binary word which is derived from the mobile station's 10-digit directory telephone number, i.e., area code and telephone number See IS-54, §2.3.1 at pp. 78-79. The mobile station stores a 16-bit value in a random challenge memory which represents the last RAND received in a random challenge global action message periodically appended to the overhead message train. The mobile station uses these messages to update the random challenge memory. The present value of the RAND is used as an input to the authentication algorithm AUTH1. See IS-54, §2.3.12 at pp. 83-84. Thus, in IS-54, the RAND is transmitted to to the mobile station before the mobile station transmits the MIN and only one RAND is in use for all the mobile stations, including false mobile stations, in the network at any particular time thereby reducing the level of security in the system. Moreover, since the RAND is known to the mobile station in advance, the RESP is precalculated and transmitted to the network along with the MIN. The network, however, could not have precalculated the RESP without receiving the MIN unless the mobile station was previously registered in the network.

The authentication key used in the AUTH1 of the IS-54 system consists of a personal identification number (PIN) which is a secret number managed by the system operator for each subscriber. The IS-54 AUTH1 also uses a factory-set electronic serial number (ESN) which uniquely identifies the mobile station to any cellular system. The RESP computed by the IS-54 AUTH1 depends on: (i) the PIN; (ii) the ESN; and (iii) the dialed digits (for mobile originated calls) or the MIN (for mobile terminated calls). The RESP transmitted by the mobile station according to IS-54 consists of the output of AUTH1 (AUTHR) (18 bits) together with a random confirmation (RANDC) (8 bits), which depends on RAND, for a total of 26 bits. No cryptological distinction is made between AUTHR and RANDC and each of these values may depend on the values of RAND, PIN, ESN and perhaps the called number. Thus, AUTHR and RANDC may be regarded as merely constituting a 26-bit RESP, the nature of which is determined by the algorithm AUTH1 which is used.

The use of the dialed digits, in accordance With IS-54, to affect the RESP in the case of a mobile Originated call set-up has certain undesirable or noteworthy consequences which are listed below:

(1) Since the dialed digits cannot be known to the network in advance, the network cannot precalculate the expected RESP to a given RAND for any particular MIN. Hence, the authentication algorithm AUTH1 cannot be executed until the dialed digits are transmitted from the mobile station to the network possibly delaying call set-up. On the other hand, if the dialed digits are not included, the same mobile station will produce the same RESP for as long as the RAND remains unchanged. In such instance, it is possible to intercept and use the RESP to place a fraudulent call and, thus, to defeat the basic reason for having AUTH1 at all.

(2) Use of the dialed digits as an input to AUTH1 precludes the home network from generating RAND and RESP pairs and sending them to visited networks in advance.

(3) Such use also precludes the advance precalculation of RAND and RESP pairs in general, which may be desirable to save time at call set-up.

(4) Such use implies some assumptions about inter-network, security-related communications and/or the location of the authentication function. In particular, it implies either that the home network transmits the secret key (and the ESN) to the visited network so that the visited network may perform authentication or, alternatively, that the dialed digits are sent on each call from the visited network to the home network so that the home network may execute authentication. The home network would not normally need to know the called subscriber number in advance.

(5) Since the dialed digits must be transmitted in unencrypted form, according to IS-54, a false mobile station may be able to place a call to the same number and then, through a "flash" or conferenceing procedure, connect to another number of his choice.

(6) In at least one existing it has been deemed necessary to introduce Called Subscriber Identity Security, i.e., masking the dialed digits, in order to prevent certain abuses and the definition of AUTH1 should accommodate such required masking.

The system of the present invention addresses all of the concerns listed above by defining an algorithm AUTH1 in which the dialed digits do not affect RESP. Any weakness caused by the exclusion of the dialed digits from AUTH1, for example, the generation of an identical RESP as long as RAND remains unchanged, is compensated for by defining a second, optional, bilateral authentication step which may be available on the traffic channel. Further safeguards are provided by the process Of encryption of the traffic data. It should be noted that the present invention may be used without substantially changing the specifications of IS-54.

Regardless of which location, the home network or the visited network, is considered more convenient for executing the authentication algorithm, some exchange of security-related subscriber information between the networks is unavoidable if authentication or encryption is to take place. In the IS-54 authentication procedure where the visited network periodically determines and broadcasts the RAND, if the authentication algorithm is executed in the home network, the visited network must transmit at least MIN and RAND to the home network in order to receive an RESP and a temporary security encryption key (S-key or call variable). On the other hand, if the authentication algorithm is executed in the visited network, that network must transmit at least MIN to the home network and the home network must, in turn, transmit to the visited network the authentication key, the ESN (if ESN is used in AUTH1) and the permanent encryption key. From a security standpoint, it is undesirable for the home network to release a subscriber's permanent key merely on demand by a visited network. Such keys should constitute the subscriber's long-term security guarantee rather than a short-term call variable. It is, therefore, more desirable that the home network, upon receiving from the visited network the MIN of a visiting mobile station, the RAND broadcast by the visited network and the RESP received by the visited network from the mobile station, generate a short-term (temporary) ciphering key (S-key or call variable) and release the S-key to the visited network only if the RESP is deemed valid.

Execution of the authentication algorithm in the home network allows the authentication algorithm to use the long-term (permanent) secret key, referred to herein as the A-key, which is unique to each mobile station. The A-key is never released outside the home network and never used directly for enciphering but is, instead, used for generating a short-term encryption key, referred to herein as the S-key. The S-key is used only for a limited period of time to be determined by the visited network. If the visited network has already acquired an S-key for a previously registered visiting mobile station, performance of the first authentication step is optional and call set-up may proceed directly to the enciphered traffic channel. Hence, it is not necessary for inter-network exchanges to take place every time a visiting mobile station places a call. If, on the other hand, the visited network decides to request an AUTH1 first authentication step, the mobile station and the home network will use the current RAND of the visited network to generate a new S-key, with other inputs to the AUTH1 algorithm being unchanged.

Cryptoanalytic Properties of Authentication Algorithms

Figure 7:
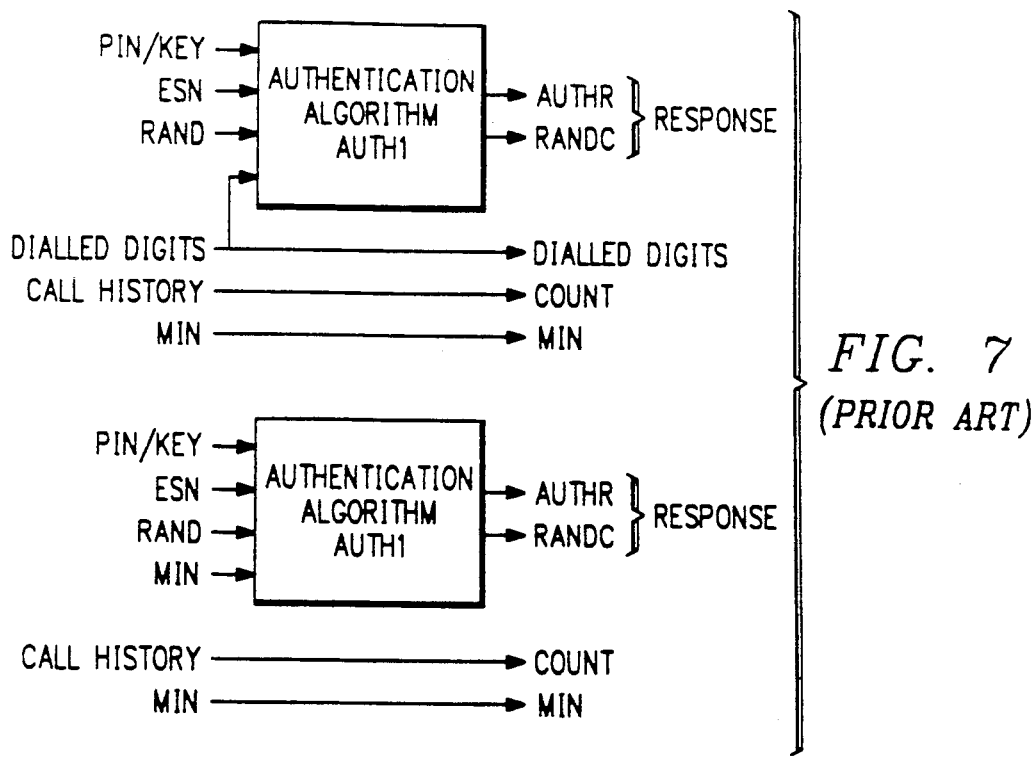
FIG. 7 is a pictorial representation of an authentication algorithm according to a known standard.

Referring now to FIG. 7, a pictorial representation of an authentication algorithm according to IS-54 may now be seen When a call is initiated by the mobile station, the mobile station uses its PIN or authentication key, its ESN, the RAND and the dialed digits to compute a response to RAND in accordance with an authentication algorithm AUTH1. The mobile station then transmits to the network the output of AUTH1 (AUTHR) together with random confirmation (RANDC), the dialed digits, the mobile station's individual call history parameter (COUNT) and the MIN. The consequences of allowing the dialed digits to affect the authentication response (AUTHR and RANDC) in mobile originated calls were discussed above and are deemed undesirable. On the other hand, it was considered desirable to accommodate the possibility of called subscriber identity masking. In the case of mobile terminated calls, little is gained by using MIN to affect the authentication response, since the PIN/key is sufficiently mobile-specific.

Figure 8:
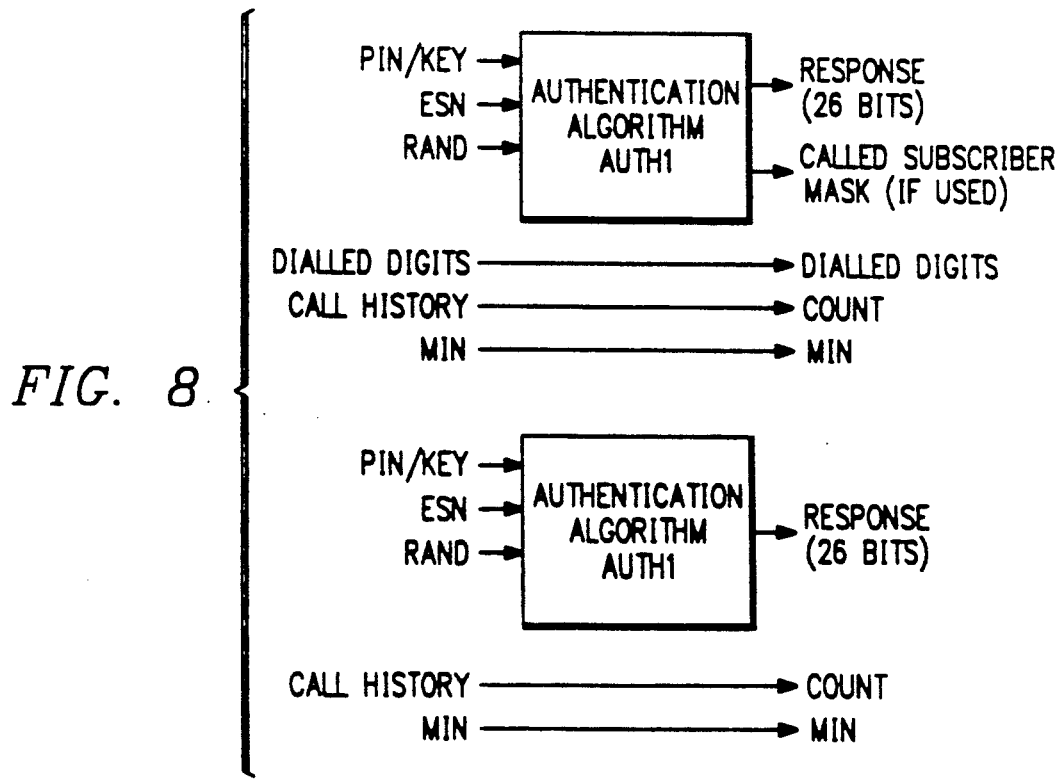
FIG. 8 is a pictorial representation of an authentication algorithm according to the present invention.

Referring now to FIG. 8, a pictorial representation of an authentication algorithm according to the present invention may be seen. Neither the dialed digits in the case of mobile originated calls, nor the MIN in the case of mobile terminated calls, are used as input to AUTH1. Further, the output of AUTH1 according to the present invention includes not only an authentication response (RESP), but also a called subscriber mask which may be used to mask the dialed digits in the case of a mobile originated call. A particular embodiment of AUTH1 is set forth and explained below.

A mobile station may be borrowed, stolen or legally acquired and its entire memory contents may be copied, including its ESN, secret keys, PIN codes, etc., and used to manufacture a number of clones. The cloning procedure may be quite sophisticated and may include software modifications which replace physically stored ESN information with electronically stored information so that a number of stored mobile station identities may by cyclically rotated within one false mobile station and used to imitate several genuine mobile stations.

Call numbering has been proposed as a means for enabling the network to identify whether clones exist. In call numbering, a modulo-64 count is kept in the mobile station and is incremented after each call or when commanded by the network. A similar count is also kept in the network. The mobile station transmits its call number to the network at call step-up and the network compares the received call number with the internally generated version. The comparison, however, may fail for one of several reasons:

(1) The mobile station may have failed to update its call count after the last call because of an abnormal termination, such as a power failure.
(2) The mobile station may have updated its call count but the network did not receive confirmation that the mobile station had done so because of an abnormal termination.
(3) A clone mobile station had placed one or more calls and stepped up the network counter.
(4) The mobile station is itself a clone and the "real" mobile station had, meanwhile, stepped up the counter.

Unfortunately, the call counter is too easily modified in either direction for the network to determine which of the preceding conditions has occurred and the network may thus forced to deny service to the mobile station. To avoid such a drastic result, the mobile subscriber may be given an additional opportunity to manually identify himself or herself to the network by, for example, keying in a short secret number which is not stored in the mobile station memory. The system of the present invention provides another anti-cloning safeguard based on a dynamic "rolling key" which is stored in each of the home network and the mobile station and which is used along with the permanent secret key for calculating authentication responses and temporary encryption keys. While such rolling keys have been previously used for authentication alone, they have not been employed to produce both authentication and encryption paramenters.

The principle behind the rolling key concept is to require certain historical information in each of the network and the mobile station to match as a means of protection against clones and as an alternative to requiring complex and expensive physical protection of mobile station memories. Specifically, in order for a clone mobile station to gain access to the system, the clone would be required to intercept the entire history of authentication challenges subsequent to the time of copying the then current key state of a genuine mobile station. According to the present invention, authentication is carried out in the home network using a combination of a rolling key, referred to herein as the B-key, which contains historical information, and the permanent secret subscriber key (A-key), which is never used directly in an encryption algorithm but is used only for generating one or more operating security keys. The authentication algorithm of the present system also computes a new value for the rolling key which becomes the current value of the rolling key whenever the mobile station and the home network agree on an update. Such an update may be triggered by a request from the visited network or the home network for execution of a bilateral authentication procedure as further described below.

The rolling key update may be performed at any time during a conversation that the visited network decides to update the call counter in the home network and the mobile station. Before updating its call counter, the home network may request a bilateral authentication of the mobile station. A correct response from the mobile station would then result in a call counter update, a rolling key update and the generation of a new conversation security key (S-key) which is sent to the visited network for use in subsequent calls. Similarly, the mobile station may update its call counter only if the bilateral authentication procedure verifies that the visited network is in genuine contact with the home network. Upon verification, the mobile station also updates its call counter and rolling key (B-key) and generates a new conversation security key (S-key) for use in subsequent calls served by the same visited network. It may be appreciated that, because the call counter and the rolling key are updated at the same time, a check of the mobile station and the home network call counters may also serve as an indication of whether the mobile station and home network are in the same rolling key state.

Bilateral Authentication

Bilateral authentication, i.e., authentication of both the mobile station and the network, may be distinguished from unilateral authentication in that the authentication information sent in both directions is key-dependent in the former, whereas only the information sent in the direction mobile station to network is key-dependent in the latter. According to the present invention, the RAND signal is used as an input to an authentication algorithm AUTH2 which generates a long RESP signal, part of which is sent from the network to the mobile station to validate the network and the other part is sent by the mobile station to the network to validate the mobile station. For example, the algorithm AUTH2 could compute a RESP from the RAND and then proceed to use the RESP as a new RAND input to the algorithm AUTH2 which then computes a RESPBIS signal. The network transmits the RAND and the RESPBIS to the mobile station which uses the RAND to compute a RESP and a RESPBIS in accordance with the AUTH2. The mobile station will send the internally generated RESP to the network only if the internally generated RESPBIS matches the RESPBIS received from the network. This prevents a false base station from extracting RAND, RESP pairs from the mobile station and the verification of the mobile station and network identities allows security status updating to proceed at a convenient later point in relative safety.

Enciphering Key (Call Variable or S-Key) Generation

When enciphering of communication is desired in a visited network the ciphering key must be communicated from the home network to the visited network. As mentioned heretofore, it is highly undesirable for the permanent secret subscriber A-keys to circulate between networks on non-specially protected links. Instead, and in accordance with the present invention, the home network never releases the A-key of a given subscriber but only uses the A-key to generate a temporary talk-variable security key (S-key) which is then used to generate a pseudo-random keystream for enciphering a particular call or group of calls. It should be understood that the "secret key" referred to in the earlier discussion of the pseudo-random keystream generation technique of the present invention represents the S-key which is directly used for encryption and not the permanent secret A-key from which the S-key is derived. The S-key is calculated and sent from the home network to the visited network upon receiving a MIN, a RAND and a RESP which are valid.

Since the S-key is calculated at the same time and by the same process as the authentication challenge-response signal (RESP), successful authentication ensures that the network and the mobile station will have the same enciphering key (S-key) and, consequently, the enciphering of user data may begin as soon as authentication has been completed. It may thus be seen that the linkage of authentication and enciphering in the system of the present invention reduces the number of different security-feature combinations that must be identified by the mobile station and the base station from four (4) to two (2).

Input and Output Bit Count

The talk-variable (S-key) may be generated as a by-product of the same authentication algorithm which produces the RESP and RESPBIS parameters mentioned above. Other desired outputs from such an algorithm may include (i) sufficient bits to mask the called subscriber number; and (ii) the next state of the rolling key (B-key) which replaces the current state if the network has been validated by bilateral authentication and/or the call counter update command has been issued.

By way of example and without any limitation on the teachings of the present invention, the following table illustrates a bit and byte count for the algorithm outputs:

| OUTPUT | NO. OF BITS | | NO. OF BYTES |
|---|---|---|---|
| RESP | 32 | | 4 |
| RESPBIS | 32 | | 4 |
| CALLED NO. MASK | 64 | | 8 |
| S-key | 64 | | 8 |
| NEXT B-key | 64 | | 8 |
| TOTAL BITS | 256 | TOTAL BYTES | 32 |

The following table illustrates a bit and byte count for the algorithm inputs:

| INPUT | NO. OF BITS | NO. OF BYTES |
|---|---|---|
| A-key | 128 | 16 |
| B-key | 64 | 8 |
| RAND | 32 | 4 |
| ESN | 32 | 4 |
| DIALED DIGITS | 0 | 0 |
| TOTAL BITS | 256 | TOTAL BYTES 32 |

The values depicted above have been deliberately rounded up to give an algorithm having a 32-byte input and a 32-byte output. If shorter variables are used, they may be expanded with constants. An algorithm having the above input and output byte counts and which is suitable for fast execution by byte-wide operations in a simple 8-bit microprocessors of the type commonly found in mobile stations, is set forth below in a separate section entitled "Definition of Authentication Algorithm."

General Properties of the Present System of Authentication

The present invention provides two steps of authentication which may be used at the network operator's discretion. The first step has been referred to as AUTH1 in the preceding description. The algorithm set forth in the section entitled Definition of Authentication Algorithm may be used for AUTH1. In such algorithm, the dialed digits do not affect the outputs. The 16-bit RAND broadcast on the control channel is used and included twice to provide a 32-bit input. The algorithm output parameters include the RESP and the MIN which may be sent by the mobile station to the network on the calling channel and the call variable (S-key) which may be used for enciphering user data immediately upon switching to a TDMA traffic channel. A n additional output parameter is provided for masking the called subscriber number in the case of mobile originated calls. This parameter may be sent from the home network to the visited network so that the called number can be unmasked.

The second authentication step, referred to as AUTH2 in the preceding description, is a bilateral authentication procedure which may be carried out at the network's discretion once communication has been established on the traffic channel. The purpose of the bilateral authentication step is to trigger a rolling key (B-key) update in both the mobile station and the home network while, at the same time, validating them to each other and, thus, preventing certain forms of false base station attacks on the security of the system. The algorithm for AUTH2 is exactly the same as the algorithm for AUTH2 set forth below in the section entitled Definition of Authentication Algorithm, except that the RAND value is determined by the home network and sent along with a RESPBIS to the visited network and, therefrom, to the mobile station. If the mobile station validates the RESPBIS, the mobile station will send a RESP to the visited network which sends the RESP to the home network. If the home network validates the RESP, the home network will send to the visited network an S-key which may be used for the next call.

Figure 9:
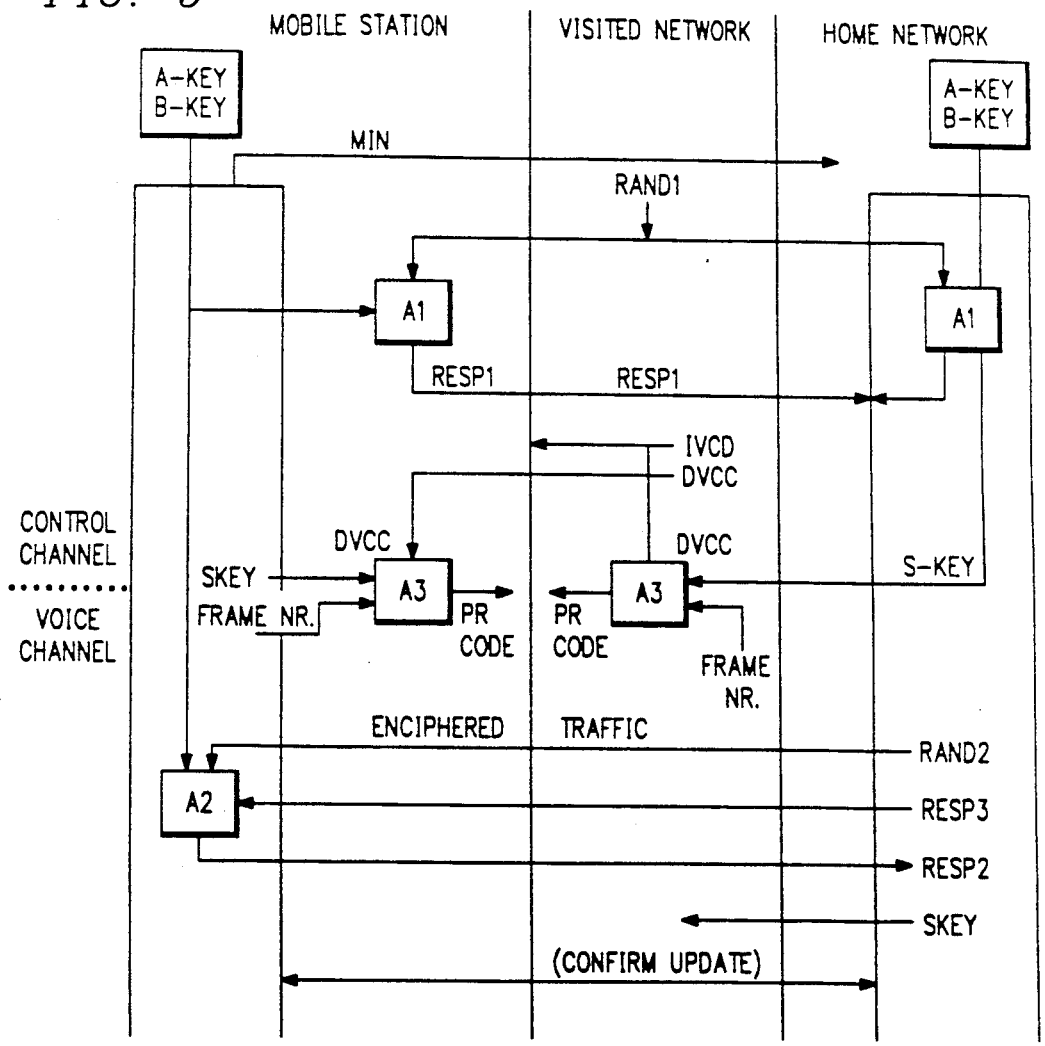
FIG. 9 is a pictoral representation of a mobile cellular system which uses the authentication algorithm and encryption technique of the present invention.

Referring now to FIG. 9, there is shown therein a pictorial representation of a mobile cellular system which uses the authentication algorithm and encryption technique of the present invention. For convenience, only one mobile station, one visited network and one home network are illustrated in FIG. 9 although it should understood that a number of mobile stations, visited networks and home networks are usually found in practice. The following abbreviations, as seen in FIG. 9, are of the following terms:

A1 and A2: AUTH1 and AUTH2, respectively
A3: Encryption technique in accordance with the present invention
IVCD: Initial Voice Channel Designation
MS: Mobile Station
VLRP: Visited Network
HLR: Home Network In FIG. 9, visited network periodically broadcasts a new RAND1 value to all mobile stations within its service area. Each Of the mobile stations computes a response RESP1 which is sent along with MIN and the call history parameter COUNT to the visited network (note that in some applications the RESP1, MIN and COUNT may be sent separately). The visited network requests the enciphering key (S-key) for a particular mobile station from the mobile station's home network. The home network compares the received response RESP1 with the parameters it has obtained by applying RAND1, ESN, A-key and B-key to the authentication algorithm A1 and determines whether the mobile station is genuine whereupon the home network releases a temporary enciphering key (S-key) to the visited network. If the visited network does not receive an enciphering key, the visited network may deny service to the mobile station.

If the visited network grants access and assigns a TDMA channel (or a control channel in some applications) to the mobile station, the parameters defining that channel, i.e., frequency, timeslot and DVCC, are sent from the visited network to the mobile station which tunes to the allocated traffic (or control) channel. Thereafter, the visited network and the mobile station may communicate in the enciphered mode using the S-key. The visited network sends its frame counter value over the unencrypted SACCH and also sends frame count synchronization messages in a fixed number of unencrypted FACCH messages as described in the related co-pending patent application entitled "Continuous Cipher Synchronization for Cellular Communication System", referred to and incorporated by reference above. Further exchanges of FACCH signalling or traffic may take place in the enciphered code.

Bilateral Authentication and Rolling Key Update

Once the mobile station and the base station have established communication on the traffic channel, the visited network may, at any time, request the execution of bilateral authentication and rolling key and call counter update by sending to the mobile station a RAND2 and a RESP3 received from the home network. The mobile station uses the RAND2, ESN, A-key and B-key in A2 to generate the expected RESP3 and RESP2. IF the internally generated RESP3 agrees with the received RESP3, the mobile station sends a RESP2 to the visited network. The visited network sends RESP2 to the home network and, if the home network's internally generated RESP2 agrees with the received RESP2, a newly calculated call variable S-key will be sent from the home network to the visited network. The visited network stores the S-key for use in future calls involving the visiting mobile station. The present call continues to be enciphered with the old S-key. Upon handover or call termination, the new S-key will come into use.

DEFINITION OF AUTHENTICATION ALGORITHM

Summary of Description

The authentication algorithm of the present invention may be used for both authentication on the calling channel (AUTH1) and bilateral authentication on the traffic channel (AUTH2). Exemplary coding of the algorithm is given for some common microprocessor implementations. In the description which follows, certain byte counts have been chosen for the input and output variables of the algorithm. It should be clearly understood, however, that such byte counts are exemplary only and are not intended and should not be construed as a limitation on the applicability of the present authentication algorithm.

Input and Output Variables of Algorithm

The algorithm of the system of the present invention uses a total of 32 bytes of input signals and generates 32 bytes of output parameters. This is achieved by two applications of an algorithm which uses 16 bytes of input variables and generates 16 bytes of output variables. The input variables are:

RAND: Provision is made for up to 4 bytes] NON-SECRET
ESN: Provision is made for up to 4 bytes] VARIABLES
Ka: 16 bytes of the permanent key (A-key)] SECRET
Kb: 8 bytes of the rolling key (B-key)] VARIABLES The 32 output bytes are designated for use withing the system as the following parameters:
0-3: Authentication response (RESP)
4-7: RESPBIS (needed for bilateral authentication)
8-15: Called subscriber number mask (if used)
16-23: Next Kb if key update occurs
24-31: Talk variable for enciphering this call (S-key)

The 32 bytes of input to the algorithm are split into groups of 16 bytes which are then used in the first application of the algorithm to produce a first 16 bytes of output (bytes 0-15). The 32 bytes of input are then split in a different way and used in the second application of the algorithm to produce a second 16 bytes of output (bytes 16-31).

General Structure of the Algorithm

The present algorithm (code) is adapted for very efficient and fast execution on simple microprocessors of the type used in cellular radio telephones. Recursive use of a small inner code loop serves to confine the code within a 100-byte region. The outer loop consists of iteratively executing a mixing process five times. The mixing process is illustrated in FIG. 10.

Figure 10:
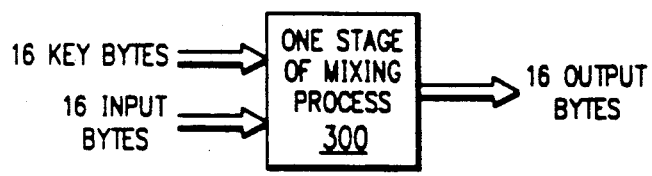
FIG. 10 is a schematic block diagram of the mixing process used in the authentication algorithm of the present invention.

Referring now to FIG. 10, there is shown therein a schematic block diagram of the mixing process used in the authentication algorithm of the present invention. The mixing process 300 is provided with a first input of 16 key bytes and a second input of 16 input bytes. The 16 input bytes to the first iteration consist of the 4 bytes of RAND 4 bytes of ESN and the 8 rolling key bytes Kb(0-7), in the following order:
RAND 4 bytes (a 6-bit RAND is repeated twice)
ESN 4 bytes
Kb(1)
Kb(2)
Kb(3)
Kb(4)
Kb(5)
Kb(6)
Kb(7)
Kb(0)

The 16 key bytes which are provided as input to each iteration of the mixing process are a cyclic selection from the 8 rolling key bytes Kb(0-7) and the 16 permanent key bytes Ka(0-15). In the first application of the algorithm, the order of use of the 16 key bytes is as follows:

| Iteration number | Key bytes used |
| --- | --- |
| 1 | Ka(0) → Ka(15) |
| 2 | Kb(0) → Kb(7); Ka(0) → Ka(7) |
| 3 | Ka(8) → Ka(15); Kb(0) → Kb(7) |
| 4 | Kb(4) → Kb(7); Ka(0) → Ka(11) |
| 5 | Ka(4) → Ka(11); Kb(0) → Kb(3) |

The above key sequences may be obtained simply by copying the key variables to a temporary memory area in the order Kb, Ka, Kb again, and selecting them sequentially from this memory starting at the appropriate place for each iteration.

Mixing Process of Algorithm

The mixing process 300 combines the 16 key bytes and the 16 input bytes in pairs using, for example, byte-wide add instructions. The mixing process 300 also uses a random 1:1 substitution box or look-up table, referred to hereinafter as an S-Box, to convert a one byte value to another one byte value. The S-Box is preferably the same look-up table used by the keystream generator of the present system and discussed above in connection with FIGS. 5-6 as the source of the parameter R. The S-Box may be implemented by a 256-byte read-only memory (ROM) which may be included in microprocessor program memory. A 1:1 S-box means that every 8-bit input value produces a unique 8-bit output value, or stated differently, every possible 8-bit value occurs only once in the table. This is desirable in order to avoid an uneven distribution of values. In certain microprocessors, the programming task may be simplified if the S-box is configured to lie on a 256-byte page boundary so that addressing the S-box would require manipulation of the least significant address byte only.

Figure 11:
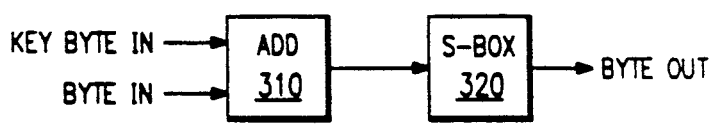
FIG. 11 is a schematic block diagram of a building block or mixing cell of the mixing process shown in FIG. 10.

Referring next to FIG. 11, a schematic block diagram of a building block or mixing cell of the mixing process may now be seen. The mixing process may be generally constructed from a plurality of mixing cells or inner loops of the type shown in FIG. 11. The particular mixing process 300 shown in FIG. 10 may be visualized as a vertical stack of 16 such mixing cells. Each of the cells is provided with one key byte and one input byte which are added together by an adder 310. The output of the adder 310 is used to address the contents of an S-box 320 which releases an output byte stored at the address defined by the output of the adder 310. A software implementation of the mixing cell or inner loop is set forth below for both "Intel" and "Motorola" architecture microprocessors.

Second Application of the Algorithm

The second application of the algorithm generates a second group of 16 output bytes which may be used for the conversation key (S-key), and, if performed, update of the rolling key (B-key or Kb(0-7)). The second application of the algorithm is exactly the same as the first application except for the order in which the key bytes and input bytes are used. In the second application of the algorithm, the order of use of the 16 key bytes is as follows:

(value=50) is in location 0, i.e, the beginning address of the ROM. The first line of data (16 values) is stored in locations 0 to 15 and subsequent lines of data are stored in the following 16 locations of the ROM, respectively.

| ADDRESS | DATA |    |    |    |    |    |    |    |    |    |    |    |    |    |    |    |
|---------|------|----|----|----|----|----|----|----|----|----|----|----|----|----|----|----|
| (00)    | 50   | 02 | F1 | C8 | DE | 21 | 0B | 1C | A5 | F6 | 9A | 61 | 10 | 4A | 3C | 34 |
| (10)    | CB   | F9 | C0 | 77 | 20 | B3 | F5 | 6B | E2 | BC | 69 | 71 | EC | 4B | 48 | 85 |
| (20)    | 5C   | 04 | 89 | 8C | 76 | 13 | CA | 99 | AD | 5E | 91 | A0 | 9C | B1 | EA | 2C |
| (30)    | 5F   | 94 | 97 | 06 | 4D | AA | 74 | 1B | B8 | B7 | 4C | 65 | 35 | 1D | 28 | EF |
| (40)    | E4   | 45 | B6 | 6D | J7 | AE | 5D | 23 | F4 | CE | E9 | 70 | E8 | 64 | 54 | F7 |
| (50)    | 6A   | 22 | 8E | AB | 88 | 9F | 26 | 57 | 32 | E1 | C2 | E5 | 93 | EB | 6F | 3F |
| (60)    | A8   | 3B | 41 | 47 | 25 | D6 | 29 | C3 | 0D | C6 | D7 | 8F | 66 | 1A | 68 | 8B |
| (70)    | 59   | CD | 80 | BA | 52 | 0A | 1E | 67 | 19 | 53 | CF | 30 | 2D | 37 | 51 | 7C |
| (80)    | 42   | B2 | B0 | A2 | 95 | D4 | B5 | 9E | 73 | 8A | 5A | 56 | 60 | 9D | A5 | 98 |
| (90)    | 40   | E3 | 49 | 0C | C1 | 3E | E6 | 7F | 92 | DF | 33 | A1 | 2F | BE | 3A | 7E |
| (A0)    | ED   | C5 | F2 | FD | 03 | BB | 78 | 90 | DB | 7B | E7 | 6E | 2E | C4 | 7A | A9 |
| (B0)    | 4F   | AF | A7 | 96 | 38 | 81 | 24 | 87 | FF | B9 | 86 | D8 | 58 | CC | D9 | 3D |
| (C0)    | 31   | F3 | 62 | 9B | FB | 0F | 07 | 39 | A6 | D2 | 16 | DD | 43 | 63 | D0 | FE |
| (D0)    | 82   | D5 | 18 | BF | 12 | 01 | 6C | A4 | 1F | A3 | 8D | 84 | 08 | 4E | 0E | FA |
| (E0)    | 11   | B4 | C9 | 46 | BD | 14 | 2B | 36 | EE | E0 | FC | DC | 7D | 5B | 72 | D1 |
| (F0)    | 55   | 2A | 05 | D3 | 27 | 44 | AC | DA | 83 | 79 | 09 | F8 | 75 | C7 | 00 | F0 |

| Iteration number | Key bytes used |
|---|---|
| 1 | Kb(0) → Kb(7); Ka(0) → Ka(7) |
| 2 | Ka(8) → Ka(15); Kb(0) → Kb(7) |
| 3 | Kb(4) → Kb(7); Ka(0) → Ka(11) |
| 4 | Ka(4) → Ka(11); Kb(0) → Kb(3) |
| 5 | Ka(0) → Ka(15) |

Additionally, the 16-byte input array is initialized using Ka bytes instead of Kb bytes as follows:
RAND(0)
RAND(1)
RAND(0)
RAND(1)
ESN(0)
ESN(1)
ESN(2)
ESN(3)
Ka(7)
Ka(8)
Ka(9)
Ka(10)
Ka(11)
Ka(12)
Ka(13)
Ka(14)

After executing all five iterations of the second application of the algorithm, the second 8 bytes appearing in the 16-byte input array are used as the temporary enciphering variable (S-key) and the first 8 bytes become the next rolling key variable if an update of the rolling key is performed. In the event of a rolling key update, the first 8 output bytes overwrite the old key bytes in the order Kb(1), Kb(2), Kb(3), Kb(4), Kb(5), Kb(6), Kb(7), Kb(0).

The Contents of the S-Box

The contents of the S-box set forth below are exemplary only and are given in further explanation of the authentication and encryption system of the present invention. As mentioned earlier, the S-Box used in the authentication algorithm may be the same as the R look-up table used in the encryption technique of the present invention. The contents of the S-box are expressed in hexadecimal notation below. The first byte

EXEMPLARY CODING FOR COMMON TYPES OF MICROPROCESSORS

8080/8085 and Z80 Code

The fixed ROM or S-box is a 256-byte table located on a page boundary addressed by a 16-bit register DE.
CELMIX: LDAX B; BC REGISTER IS USED TO POINT TO KEY BYTES
ADD M; THE HL REGISTER POINTS TO INPUT BYTES
MOV E,A; THE SUM OF A KEY BYTE AND AN INPUT BYTE
LDAX D; ADDRESSES THE S-BOX
MOV M,A; OUTPUT BYTE FROM S-BOX OVERWRITES INPUT BYTE
INX H; NEXT INPUT BYTE ADDRESS
INX B; NEXT KEY BYTE ADDRESS
RET
The above routine is used as follows:
(1) Set D register to MSB of S-box starting address which lies on a page boundary.
(2) Initialize BC to the appropriate starting address in the array of key bytes according to the iteration number as described previously.
(3) Initialize HL to point to the 16-byte array of input bytes.
(4) Execute routine 16 times.

The immediately preceding steps implement one iteration of the mixing process. Prior to the first iteration, the 16-byte input array is initialized with RAND, ESN and the above-indicated selection of A-key or B-key bytes.

The 16 output bytes lie in the original input byte array and are available for input to the next iteration. After performing all five iterations with the above-indicated selections of key bytes the 16 output bytes represent the desired output of the algorithm.

Code for 6809

CELMIX LDA ,X+; THE X REGISTER IS USED TO POINT TO KEY BYTES
ADDA ,Y; THE Y REGISTER POINTS TO INPUT BYTES

LDA A,U; U=ADDRESS OF S-BOX START, A=-OFFSET FROM START
STA ,Y+; BYTE FROM S-BOX OVERWRITES INPUT BYTE RET

+ signifies autoincrement of indicated register after use
This routine is used as follows:
(1) Set U register to address to start of S-box.
(2) Initialize X register to point to appropriate key byte according to the order of use of key bytes described previously.
(3) Initialize Y register to point to the beginning of the 16-byte input byte array.
(4) Execute routine 16 times.

The immediately preceding steps implement one iteration of the mixing process illustrated in FIG. 10. Prior to the first iteration, the 16-byte input array is initialized with RAND, ESN and the specified selection of A-key or B-key bytes, as in the previous example. Hence, it is only necessary to re-initialize the Y register to the start of the input byte array and to reinitialize the X register to point to the appropriate key byte for each stage before executing the four remaining iterations. After the fifth iteration, the 16-byte input array contains the 16 output bytes from the first application of the algorithm which are used for authentication and, if implemented, subscriber identity masking.

It should be appreciated from the foregoing that a number of concepts are implemented in the system of the present invention. Along these concepts is the principle that some part of the authentication key (i.e., the "rolling key" part) should be periodically updated so that clones would be required to track the history of the system. Bilateral authentication is used on the traffic channel to effect a rolling key update which is linked to a call counter update.

It may also be seen that execution of the authentication algorithm of the present invention also generates a temporary conversation key or "talk-variable" security key (S-key) which may be used for enciphering a subsequent call or group of calls and the actual secret permanent subscriber key (A-key) is never released by the home network. In addition, the algorithm of the present invention produces another output which may be used to mask the called subscriber identity.

The foregoing description shows only certain particular embodiments of the present invention. However, those skilled in the art will recognize that many modifications and variations may be made without departing substantially from the spirit and scope of the present invention. Accordingly, it should clearly understood that the form of the invention described herein is exemplary only and is not intended as a limitation on the scope of the invention as defined in the following claims.

What is claimed is:

1. A method for the generation of parameters for use in enhancing the security of communication in a communications system in which a mobile station is assigned a unique multi-digit permanent key and in which a changeable multi-digit rolling key is employed for increased security, both said permanent key and said rolling key being stored in said mobile station and the network of the mobile, said method comprising:
receiving at a location a plurality of multi-digit input signals, including, a signal representative of an authentication inquiry from the network along with the multi-digit permanent key of a particular mobile station and the multi-digit rolling key associated with said particular mobile at that particular time;
arranging at least some of the digits of said input signals in a first grouping:
calculating from said first grouping of input signals and said permanent and rolling key digits a first output value in accordance with a first algorithm; and
assigning sequentially arranged blocks of digits comprising said first output value to selected parameters for use within said system, including, an authentication response to be used by said mobile station to reply to the authentication inquiry by the network and an authentication signal to be used by the network to authenticate it to the mobile station.

2. A method for the generation of parameters for use in enhancing the security of communication in a communications system as set forth in claim 1 in which:
the output parameters for use within said system to which said sequentially arranged blocks of digits comprising said first output value are assigned also includes a signal to be used to mask information transmitted by the mobile station.

3. A method for the generation of parameters for use in enhancing the security of communication in a communications system as set forth in claim 1 in which:
said first algorithm comprises recursive executions of a code loop.

4. A method for the generation of parameters for use in enhancing the security of communication in a communications system as set forth in claim 1 in which:
said input signals and said key digits are grouped into bytes and said first algorithm comprises a mixing process in which respective pairs of bytes of input signals and key digits are iteratively added to one another.

5. A method for the generation of parameters for use in enhancing the security of communication in a communications system as set forth in claim 4 in which:
calculation in accordance with said first algorithm comprises grouping a sequence of bytes including at least some of said input signals and said rolling key digits and then mixing respective bytes thereof with bytes of said permanent key arranged in a first order by adding.

6. A method for the generation of parameters for use in enhancing the security of communication in a communications system as set forth in claim 5 in which:
calculation in accordance with said first algorithm comprises grouping a sequence of bytes including at least some of said input signals and said rolling key digits and then mixing respective bytes thereof with bytes of said permanent key and said rolling key arranged in a first order by adding.

7. A method for the generation of parameters for use in enhancing the security of communication in a communications system as set forth in claim 4 in which:
the value obtained from at least some additions is used to obtain a number from a fixed look-up table having a 1:1 mapping between its input and its output.

8. A method for the generation of parameters for use in enhancing the security of communication in a communications system as set forth in claim 7 in which:
said fixed look-up table is also used to obtain numbers for use in an algorithm for generating a pseudo-random keystream for enciphering communications data within said system.

9. A method for the generation of parameters for use in enhancing the security of communication in a communications system as set forth in claim 1 which also includes:
- arranging the digits of said input signals in a second grouping;
- calculating from said second grouping of input signals and said permanent and rolling key digits a second output value in accordance with a second algorithm; and
- assigning sequentially arranged blocks of digits comprising said second output value to selected parameters for use within said system, including, a new rolling key to be associated with the particular mobile at a next particular time.

10. A method for the generation of parameters for use in enhancing the security of communications in a communications system as set forth in claim 9 in which said step of assigning sequentially arranged blocks of digits comprising said second output value to selected parameters for use within said system also includes a security key to be used to calculate a keystream of pseudo-random bits for enciphering communications data within the system.

11. A method for the generation of parameters for use in enhancing the security of communications in a communications system as set forth in claim 9 in which:
- said first and second algorithms comprise recursive executions of a code loop.

12. A method for the generation of parameters for use in enhancing the security of communication in a communications system as set forth in claim 9 in which:
- said input signals and said key digits are grouped into bytes and said first and second algorithms comprise a mixing process in which respective pairs of bytes of input signals and key digits are iteratively added to one another.

13. A method for the generation of parameters for use in enhancing the security of communication in a communications system as set forth in claim 9 in which:
- calculation in accordance with said second algorithm comprises grouping a sequence of bytes including at least some of said input signals and said rolling key digits and then mixing respective bytes thereof with bytes of said permanent key arranged in a second order, different from said first order, by adding.

14. A method for the generation of parameters for use in enhancing the security of communication in a communications system as set forth in claim 13 in which:
- calculation in accordance with said second algorithm comprises grouping a sequence of bytes including at least some of said input signals and said rolling key digits and then mixing respective bytes thereof with bytes of said permanent key and said rolling key arranged in a second order, different from said first order, by adding.

15. A method for the generation of parameters for use in enhancing the security of communication in a communications system as set forth in claim 1 in which:
- said method is executed under the control of the home exchange of said mobile station.

16. A system for the generation of parameters for use in enhancing the security of communication in a communications system in which a mobile station is assigned a unique multi-digit secret permanent key and in which a changeable multi-digit rolling key is employed for increased security, both said permanent key and said rolling key being stored in each mobile station and the network of the mobile, said method comprising:
- means for receiving at a location a plurality of multi-digit input signals, including, a signal representative of an authentication inquiry from the network along with the multi-digit permanent key of said particular mobile station, and the multi-digit rolling key associated with said particular mobile at that particular time;
- means for arranging the digits of said input signals in a first grouping;
- means for calculating from said first grouping of input signals and said permanent and rolling key digits a first output value in accordance with a first algorithm; and
- means for assigning sequentially arranged blocks of digits comprising said first output value to selected parameters for use within said system, including, an authentication response to be used by said mobile station to reply to the authentication inquiry by the network and an authentication signal to be used by the network to authenticate it to the mobile station.

17. A system for the generation of parameters for use in enhancing the security of communication in a communications system as set forth in claim 16 in which:
- the output parameters for use within said system to which said sequentially arranged blocks of digits comprising said first output value are assigned also includes a signal to be used to mask information transmitted by the mobile station.

18. A system for the generation of parameters for use in enhancing the security of communication in a communications system as set forth in claim 16 in which:
- said first algorithm comprises recursive executions of a code loop.

19. A system for the generation of parameters for use in enhancing the security of communication in a communications system as set forth in claim 16 in which:
- said input signals and said key digits are grouped into bytes and said first algorithm comprises a mixing process in which respective pairs of bytes of input signals and key digits are iteratively added to one another.

20. A system for the generation of parameters for use in enhancing the security of communication in a communications system as set forth in claim 19 in which:
- said means for calculation in accordance with said first algorithm comprises means for grouping a sequence of bytes including at least some of said input signals and said rolling key digits and then mixing respective bytes thereof with bytes of said permanent key arranged in a first order by adding.

21. A system for the generation of parameters for use in enhancing the security of communication in a communications system as set forth in claim 20 in which:
- said means for calculation in accordance with said first algorithm comprises means for grouping a sequence of bytes including at least some of said input signals and said rolling key digits and then mixing respective bytes thereof with bytes of said permanent key and said rolling key arranged in a first order by adding.

22. A system for the generation of parameters for use in enhancing the security of communication in a communications system as set forth in claim 19 in which:
- the value obtained from at least some additions is used to obtain a number from a fixed look-up table having a 1:1 mapping between its input and its output.

23. A system for the generation of parameters for use in enhancing the security of communication in a communications system as set forth in claim 22 in which:
said fixed look-up table is also used to obtain numbers for use in an algorithm for generating a pseudo-random keystream for enciphering communications data within said system.

24. A system for the generation of parameters for use in enhancing the security of communication in a communications system as set forth in claim 16 which also includes:
means for implementing said system under the control of the home exchange of said mobile station.

25. A system for the generation of parameters for use in enhancing the security of communication in a communications system as set forth in claim 10 which also includes:
means for arranging the digits of said input signals in a second grouping;
means for calculating from said second grouping of input signals and said permanent and rolling key digits a second output value in accordance with a second algorithm; and
means for assigning sequentially arranged blocks of digits comprising said second output value to selected parameters for use within said system, including, a new rolling key to be associated with the particular mobile at a next particular time.

26. A system for the generation of parameters for use in enhancing the security of communications in a communications system as set forth in claim 25 in which said means for assigning sequentially arranged blocks of digits comprising said second output value to selected parameters for use within said system also includes a security key to be used to calculate a keystream of pseudo-random bits for enciphering communications data within the system.

27. A system for the generating of parameters for use in enhancing the security of communication in a communications system as set forth in claim 25 in which:
said first and second algorithms comprise recursive executions of a code loop.

28. A system for the generation of parameters for use in enhancing the security of communication in a communications system as set forth in claim 25 in which:
said input signals and said key digits are grouped into bytes and said first and second algorithms comprise a mixing process in which respective pairs of bytes of input signals and key digits are iteratively added to one another.

29. A method for the generation of parameters for use in authenticating access in a communication system in which a mobile station is assigned a unique multi-digit permanent key and in which a changeable multi-digit rolling key is employed for increased security, both said permanent key and said rolling key being stored in said mobile station and in the network with which the mobile is to communicate, said method comprising:
providing a plurality of multi-digit input signals, including, a signal representative of an authentication inquiry from the network along with the multi-digit permanent key of said particular mobile station and the multi-digit rolling key associated with said particular mobile at that particular time;
arranging at least some of the digits of said input signals in a first grouping;
calculating from said first grouping of input signals and said permanent and rolling key digits a first output value in accordance with a first algorithm; and
assigning sequentially arranged groups of digits comprising at least part of said first output value to selected parameters for use within said system, including, an authentication response to be used by said mobile station to reply to the authentication inquiry by the network.

30. A method for the generation of parameters for use in authenticating access in a digital communications system as set forth in claim 29, in which said step of assigning sequentially arranged groups of digits comprising at least part of said first output value to selected parameters for use within said system also include an authentication signal to be used by the network to authenticate it to the mobile station.

31. A method for the generation of parameters for use in authenticating access in a communications system as set forth in claim 29, which also includes:
arranging the digits of said input signals in a second grouping;
calculating from said second grouping of input signals and said permanent and rolling key digits a second output value in accordance with a second algorithm; and
assigning sequentially arranged blocks of digits comprising at least part of said second output value to selected parameters for use within said system, including, a security key to be used to calculating a keystream of pseudo-random bits for enciphering communications data within the system.

32. A method for the generation of parameters for use in authenticating access in a communications system as set forth in claim 29 wherein said step of assigning sequentially arranged blocks of digits comprising at least part of said second output value to selected parameters for use within said system also include a new rolling key to be associated with the particular mobile at a next particular time.

* * * * *

UNITED STATES PATENT AND TRADEMARK OFFICE
CERTIFICATE OF CORRECTION

PATENT NO. : 5,091,942  
DATED : Feb. 25, 1992  
INVENTOR(S) : Paul Dent

Page 1 of 4

It is certified that error appears in the above-identified patent and that said Letters Patent is hereby corrected as shown below:

```
Column 2, line 12;        delete "Will"
                          insert --will--

Column 2, line 32;        After "and" insert --generating--

Column 3, line 32;        delete "Of"
                          insert --of--

Column 6, line 3; delete "Of"
                          insert --of--

Column 6, line 44;        After "system" insert --,--

Column 7, line 38;        delete "Of"
                          insert --of--

Column 8, line 51;        delete "ill"
                          insert --111--

Column 9, line 34;        delete "Phase"
                          insert --phase--

Column 9, line 62;        delete "the4"
                          insert --the--

Column 10, line 28;       delete "FACCH"
                          insert --SACCH--

Column 10, line 28;       delete "FACCH"
                          insert --SACCH--

Column 12, line 18;       After "respectively" insert --,--

Column 12, line 22;       delete "counted"
                          insert --counter,--

Column 12, line 36;       delete "hits"
                          insert --bits--

Column 12, line 36;       After "should" insert --,--
```

UNITED STATES PATENT AND TRADEMARK OFFICE
CERTIFICATE OF CORRECTION

PATENT NO. : 5,091,942
DATED : Feb. 25, 1992
INVENTOR(S) : Paul Dent

It is certified that error appears in the above-identified patent and that said Letters Patent is hereby corrected as shown below:

| | |
|---|---|
| Column 12, line 39; | delete "sunset"<br>insert --subset-- |
| Column 12, line 48; | delete "Would"<br>insert --would-- |
| Column 12, line 58; | before the word "on", delete "on" |
| Column 13, line 2; | delete "offer"<br>insert --order-- |
| Column 13, line 3; | After "additionally" insert --,-- |
| Column 13, line 60; | delete "Of"<br>insert --of-- |
| Column 14, line 19; | delete "Of"<br>insert --of-- |
| Column 14, line 26; | delete "Will"<br>insert --will-- |
| Column 15, line 50; | delete "Of"<br>insert --of-- |
| Column 15, line 53; | delete "Of"<br>insert --of-- |
| Column 16, line 12; | After "iteration" insert --,-- |
| Column 16, line 50; | delete "B+K"<br>insert --B+'K-- |
| Column 17, line 35; | After "number" insert --.-- |
| Column 17, line 45; | delete "to" before the word "to" |
| Column 18, line 8; | delete "With"<br>insert --with-- |

UNITED STATES PATENT AND TRADEMARK OFFICE
CERTIFICATE OF CORRECTION

PATENT NO. : 5,091,942

DATED : Feb. 25, 1992

INVENTOR(S) : Paul Dent

It is certified that error appears in the above-identified patent and that said Letters Patent is hereby corrected as shown below:

| | |
|---|---|
| Column 18, line 9; | delete "Originated"<br>insert --originated-- |
| Column 18, line 48; | After "existing" insert --network,-- |
| Column 18, line 63; | delete "Of"<br>insert --of-- |
| Column 19, line 53; | After "seen" insert --.-- |
| Column 23, line 54; | delete "AUTH2"<br>insert --AUTH1-- |
| Column 24, line 2; | After "should" insert --be-- |
| Column 24, line 11; | delete "VLRP"<br>insert --VLR-- |
| Column 24, line 15; | delete "Of"<br>insert --of-- |
| Column 25, line 34; | delete "withing"<br>insert --within-- |
| Column 25, line 65; | delete "6-bit"<br>insert --16-bit-- |
| Column 28, line 61; | After "bytes" insert --,-- |
| Column 28, line 65; | After "CELMIX" insert --:-- |

UNITED STATES PATENT AND TRADEMARK OFFICE
CERTIFICATE OF CORRECTION

PATENT NO. : 5,091,942

DATED : Feb. 25, 1992

INVENTOR(S) : Paul Dent

It is certified that error appears in the above-indentified patent and that said Letters Patent is hereby corrected as shown below:

Column 32, line 2;  delete "method"
                    insert --system--

Column 32, line 13; delete "input,"
                    insert --input--

Signed and Sealed this

First Day of March, 1994

Attest:

BRUCE LEHMAN

Attesting Officer   Commissioner of Patents and Trademarks